(12) United States Patent
Okamoto et al.

(10) Patent No.: US 7,721,088 B2
(45) Date of Patent: May 18, 2010

(54) TERMINAL DEVICE, SERVER DEVICE, AND CONTENT DISTRIBUTION SYSTEM

(75) Inventors: Ryuichi Okamoto, Osaka (JP); Akio Higashi, Osaka (JP); Hiroki Murakami, Osaka (JP); Katsumi Tokuda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/374,869

(22) PCT Filed: Jul. 27, 2007

(86) PCT No.: PCT/JP2007/064820

§ 371 (c)(1),
(2), (4) Date: Jan. 23, 2009

(87) PCT Pub. No.: WO2008/013287

PCT Pub. Date: Jan. 31, 2008

(65) Prior Publication Data

US 2009/0187762 A1 Jul. 23, 2009

(30) Foreign Application Priority Data

Jul. 27, 2006 (JP) .............................. 2006-205271

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| H04L 9/32 | (2006.01) |
| H04L 9/00 | (2006.01) |
| H04N 7/16 | (2006.01) |
| H04N 7/167 | (2006.01) |
| B41K 3/38 | (2006.01) |
| H04K 1/00 | (2006.01) |

(52) U.S. Cl. .............................. 713/157; 726/4; 726/17; 726/27; 713/178; 380/59; 380/200; 380/255; 380/277; 725/25

(58) Field of Classification Search .................. 726/2–4, 726/16, 17, 21, 26, 27; 713/150, 156–158, 713/168, 171, 175, 176, 178, 181; 380/59, 380/200, 210, 255, 259, 262, 277–279; 725/25, 725/29, 31
See application file for complete search history.

(56) References Cited

U.S. PATENT DOCUMENTS

2004/0083364 A1     4/2004     Andreaux et al.

(Continued)

FOREIGN PATENT DOCUMENTS

JP     10-341212     12/1998

(Continued)

OTHER PUBLICATIONS

International Search Report issued Sep. 18, 2007 in International Application No. PCT/JP2007/064820.

(Continued)

*Primary Examiner*—Nasser Moazzami
*Assistant Examiner*—Oscar A Louie
(74) *Attorney, Agent, or Firm*—Wenderoth, Lind & Ponack L.L.P.

(57) ABSTRACT

To provide a content distribution system which can prevent use of content which has been temporarily stored after the valid period.

A content distribution system (1) including a license server (101) which issues a license, a content server (102) which transmits the content, a terminal device (103) which controls use of the content based on the issued license. The terminal device (103) does not allow the use of the received encrypted content when it is judged that the encrypted content received from the content server (102) is not the content received in real time.

11 Claims, 18 Drawing Sheets

U.S. PATENT DOCUMENTS

2005/0144019 A1* 6/2005 Murakami et al. .............. 705/1
2006/0005031 A1* 1/2006 Apostolopoulos ........... 713/179
2006/0200412 A1* 9/2006 Fahrny et al. ................. 705/50

FOREIGN PATENT DOCUMENTS

| JP | 11-225322 | 8/1999 |
| JP | 2002-218431 | 8/2002 |
| JP | 2004-515972 | 5/2004 |
| JP | 2004-304600 | 10/2004 |
| JP | 2005-160032 | 6/2005 |
| WO | 02/047356 | 6/2002 |
| WO | 2004/088987 | 10/2004 |
| WO | 2005/046167 | 5/2005 |

OTHER PUBLICATIONS

Request No. 17 for Recommendation of Telecommunications Technology Council, Showa 63 (1988), Technical conditions for paid scheme in satellite television broadcasting, pp. 11,2.2.2.(1)(2)(3) & 12,(5) (with English translation).

Request No. 74 for partial recommendation of Telecommunications Technology Council, Heisei 7 (1995), Technical conditions for digital broadcasting scheme, pp. 25-31 (with English translation).

* cited by examiner

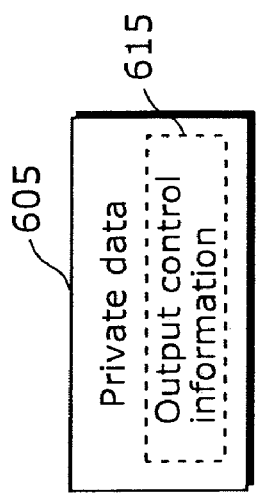
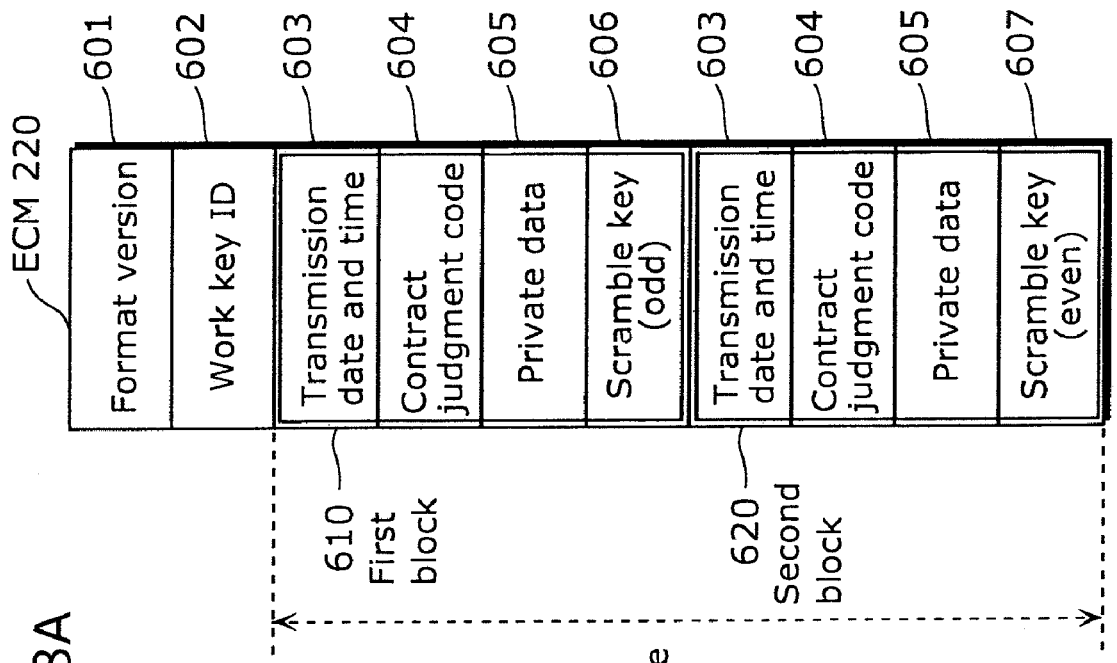

TERMINAL DEVICE, SERVER DEVICE, AND CONTENT DISTRIBUTION SYSTEM

TECHNICAL FIELD

The present invention relates to a content distribution system for distributing digital content such as video and music by using a network, and in particular to a server device which distributes the digital content and decryption keys for the digital content and a terminal device which uses the digital content by using the decryption keys.

BACKGROUND ART

Recently, systems called "content distribution systems" have been developed. Each of the "content distribution systems" makes it possible to distribute digital content (simply referred to as "content" hereinafter) such as music, video, games, or the like from a server device to a terminal device through communication such as the Internet and digital broadcast, and use the content in the terminal device. In a general content distribution system, a digital rights management technique is used in order to protect the copyright of the content and prevent a malicious user from using the content in an unauthorized manner. More specifically, this "digital rights management technique" is a technique for securely controlling the use of the content by using an encryption technique or the like.

For example, paid broadcasting employs a scramble control method according to which a video signal and an audio signal are scrambled and transmitted, and only the terminals having a viewing right descramble the video and audio signals to enable viewing of the content.

Details of the above-mentioned conventional scramble control method are disclosed in Non-patent Reference 1 and Non-patent Reference 2.

The conventional scramble control method utilizes two types of information items called individual information and program information (referred to as "content-related information" hereinafter in the present invention). The individual information is information indicating a subscription contract made for each of receivers, and includes a work key which is required to decrypt the details of the contract, the valid periods of the contracts, and content-related information items to be transmitted later on. The content-related information is information to be transmitted in parallel with the scrambled video and audio signals and the like, and includes a scramble key which is required to descramble these signals, the current time indicating the moment, and the details of the program.

The terminal device which receives the content receives the individual information addressed to the terminal itself and holds the details as the contract information prior to the reception of the content-related information. In the viewing of the program, the terminal device receives content-related information together with the video and audio signals, checks the current time and the valid period of the contract which are included in the content-related information, and checks whether or not the contract has expired. In the case where the content has expired, the terminal device judges to be "No viewing right". In the case where the content has not expired, the terminal device checks the presence/absence of a viewing right by checking the program information and the contract information. Here, only when the judgment shows that "viewing right exists", the terminal device extracts the scramble key and descrambles the video and audio signals and the like.

In this way, the conventional scramble control method makes a judgment on the valid period of a contract based on the current time which is transmitted together with the content.

[Non-patent Reference 1]
Request No. 17 for recommendation of Telecommunications Technology Council, Showa 63 (1988), Eisei housou ni yoru television housou ni okeru yuryo housiki ni kansuru gijutsu teki joken (Technical conditions for paid scheme in satellite television broadcasting)

[Non-patent Reference 2]
Request No. 74 for partial recommendation of Telecommunications Technology Council, Heisei 7 (1995), Digital housou houshiki ni kakaru gijutsu teki joken (Technical conditions for digital broadcasting scheme)

DISCLOSURE OF INVENTION

Problems that Invention is to Solve

However, a terminal device which receives distributed content does not always receive content-related information which is transmitted together with content immediately after the transmission. For example, as shown in FIG. 1, it is conceivable that a user temporarily stores the content and the content-related information which is transmitted together with the content in a storage device 100 or the like, and re-transmits them to the terminal device 1030 on a later day. In this case, the time at which the terminal device 1030 receives the content and the content-related information is different from the current time included in the content-related information. Thus, according to the conventional method, it may be judged that a contract has not yet expired although the contract has actually expired. In addition, in the case where the content and the content-related information have been repeatedly re-transmitted, the terminal device 1030 may allow the use of the content over and over again each time of the re-transmission. In addition, it is required that the current time and the like included in the content-related information is not falsified in order to perform processing such as making a judgment on the valid period. In addition, the terminal device 1030 is required to check the integrity of the received content-related information. This processing is performed during the interval of decoding of the content, and thus the processing load for this process must be small.

The present invention has been made considering the above-mentioned problems, and has a first object to provide a content distribution system and the like which makes it possible to prevent a user from using expired content by temporarily storing the content.

In addition to the above-described object, the present invention has a second object to provide a content distribution system and the like which makes it possible to check the integrity of the content-related information according to a method requiring a small processing load.

Means to Solve the Problems

In order to achieve the above-described objects, the terminal device according to the present invention is a terminal device in a content distribution system including a server device and the terminal device, and the terminal device includes: a receiving unit configured to receive, from the server device, (I) an encrypted content, and (II) content-related information including (II-i) pieces of transmission date and time information and (II-ii) a plurality of content decryption keys for decrypting the encrypted content; a time information obtaining unit configured to obtain a piece of current date and time information indicating a current date and time; a real-time reception judging unit configured to judge whether or not a time difference between a time indicated by the piece of current date and time information and a time indicated by the pieces of transmission date and time information falls within a predetermined range, and judge that the content is being received in real time when the time difference falls within the predetermined range; and a content use control unit configured to limit the use of the encrypted content when the real-time reception judging unit judges that the content is being received not in real time.

In addition, the server device according to the present invention, is a server device in a content distribution system including the server device and a terminal device, the server device includes: a transmitting unit configured to transmit an encrypted content and content-related information including pieces of transmission date and time information of the encrypted content and a plurality of content decryption keys for decrypting the encrypted content; a related information generating unit configured to generate, in the content-related information, the plurality of content decryption keys for decrypting the encrypted content; a transmission date and time identifying unit configured to generate, in the content-related information, the pieces of transmission date and time information each indicating a date and time at which the content-related information is transmitted; and a related information encrypting unit configured to encrypt, in Cipher Block Chaining (CBC) mode, the content-related information in which the plurality of content decryption keys and the pieces of transmission date and time information have been generated, wherein the related information generating unit is configured to generate, in the content-related information, the plurality of content decryption keys, and the transmission date and time identifying unit is configured to generate the pieces of transmission date and time information each indicating a same date and time in an encryption block immediately preceding an encryption block for a corresponding one of the plurality of content decryption keys.

In addition, the content-related information generating device according to the present invention, is a content-related information generating device which generates content-related information to be transmitted together with an encrypted content, the content-related information generating device includes: a related information generating unit configured to generate, in the content-related information, a plurality of content decryption keys for decrypting the encrypted content; a transmission date and time setting unit configured to generate, in the content-related information, pieces of transmission date and time information each indicating a date and time at which the content-related information is transmitted; and a related information encrypting unit configured to encrypt, in Cipher Block Chaining (CBC) mode, the content-related information in which the plurality of content decryption keys and the pieces of transmission date and time information have been generated, wherein the related information generating unit is configured to generate, in the content-related information, the plurality of content decryption keys, and the transmission date and time identifying unit is configured to generate the pieces of transmission date and time information each indicating a same date and time in an encryption block immediately preceding an encryption block for a corresponding one of the plurality of content decryption keys.

It is to be noted that the present invention can be implemented as a content use method or related information generating method which has the steps corresponding to the unique structural units of the terminal device or the server device, as an integrated circuit, and a program causing a computer to execute these steps of the method. As a matter of course, the present invention can be widely distributed through recording media such as DVDs and/or transmission media such as the Internet.

Further, the present invention can be implemented as a content distribution system including the terminal device and the server.

Effects of the Invention

According to the present invention, it becomes possible to provide the content distribution system which allows the use of content only when the content and the content-related information are received immediately after the transmission by a provider.

In addition, according to the present invention, it becomes possible to check the integrity of the content-related information by performing a decrypting process on the content-related information in conventional Cipher Block Chaining (CBC) mode and a process for comparing the decrypted information with the corresponding encrypted information without performing processing such as hash value calculation requiring large processing load and a special decrypting process not using the CBC mode.

BRIEF DESCRIPTION OF DRAWINGS

FIGS. 8(*a*) and (*b*) is a diagram showing an example of an ECM according to the present invention.

NUMERICAL REFERENCES

Figure 1:
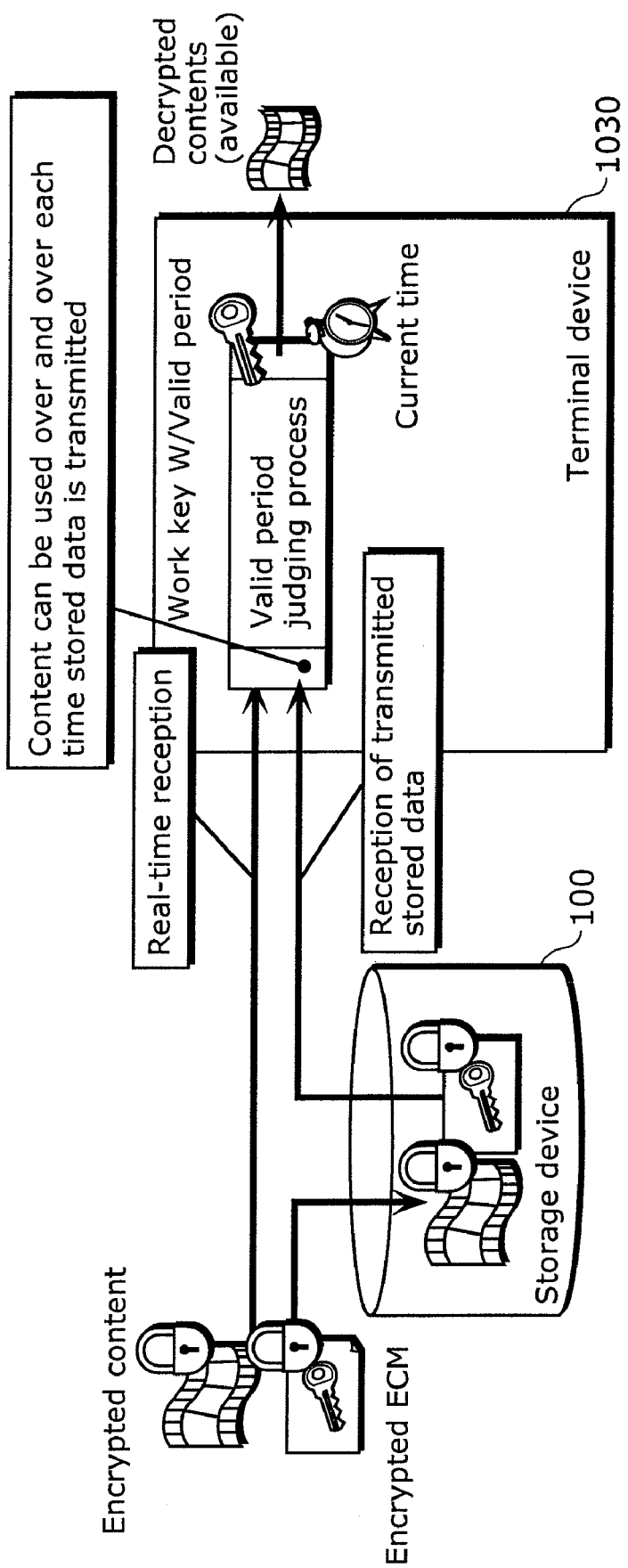
FIG. 1 is a diagram for illustrating a problem in a conventional content distribution system.

100 Storage device
101 License server
102 Content server
103 Terminal device
104 Transmission medium
201 Scramble key Ks
203, 401 Work key Kw
205 Session key Kse
220 ECM
230 License
301, 503 Work key storage unit
302 Contract information storage unit
303, 902 Unique information managing unit
304 License generating unit
305 License transmitting unit
402, 602 Work key ID
403 Contract code
404 Starting date and time
405 Ending date and time
406 Output control information
501 Content storage unit
502 Content attribute information storage unit
504 Content encoding unit
505 Scramble key generating unit
506 Content encrypting unit
507 Transmission date and time identifying unit
508 Related information generating unit
509 Related information encrypting unit
510 Multiplexing unit
511 Transmitting unit
601 Format version
603 Transmission date and time
604 Contract judgment code
605 Private data
606 Scramble key (odd)
607 Scramble key (even)
615 Output control information
901 License storage unit
903 Licenser receiving unit
904 License managing unit
905 Content receiving unit
906 Demultiplexing unit
907 Time information obtaining unit
908 Related information decrypting unit
909 Real-time reception judging unit
910 Falsification detecting unit
911 Contract information judging unit
912 Content use control unit
913 Content storage control unit
1030 Terminal device

BEST MODE FOR CARRYING OUT THE INVENTION

An embodiment according to the present invention is described below with reference to the drawings. The present invention is described using the following embodiment and the attached drawings, but it is to be noted that such descriptions are intended to be exemplary and thus are not intended to limit the present invention.

Figure 2:
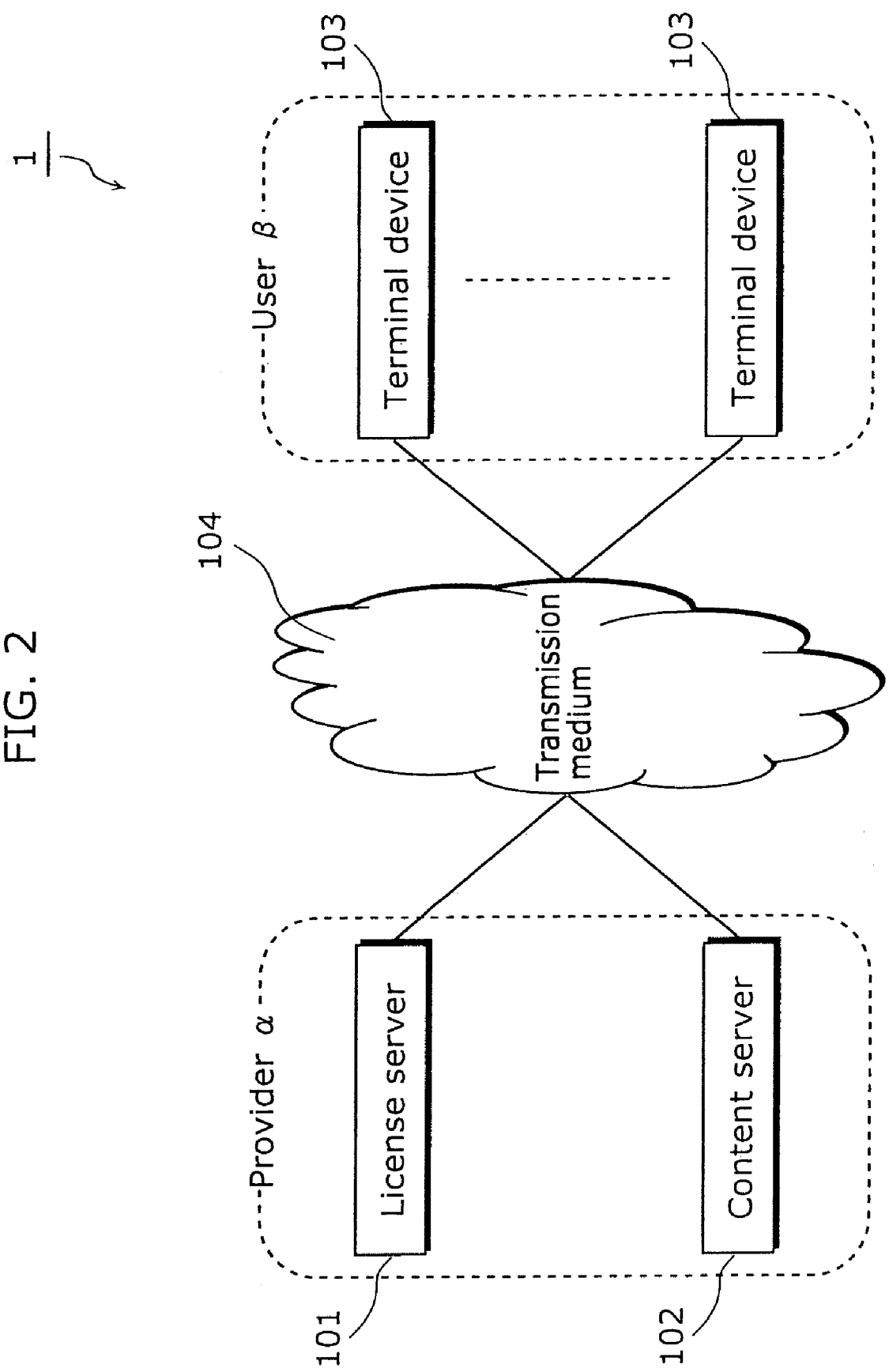
FIG. 2 is a block diagram showing the overall structure of the content distribution system according to the present invention.

FIG. 2 is a diagram showing the overall structure of the content distribution system 1 according to the present invention.

In FIG. 2, the content distribution system 1 includes a license server 101, a content server 102, plural terminal devices 103, and a transmission medium 104. Each of the structural elements of the content distribution system 1 is described below.

The license server 101 is disposed at the side of a provider α, and is intended to manage the contract (regarding content usage right) made for a user β and distribute, to a terminal device 103, the license including the information related to the contract (contract information) for the user β. When the license is distributed from the license server 101 to the terminal device 103, this license is securely distributed through a secure authenticated channel (referred to as "SAC" hereinafter). For example, SSL (Secure Socket Layer) can be used as a SAC. It is to be noted that each of the structural elements of a license is described in detail later with reference to the drawings.

The content server 102 is disposed at the provider a side, and is intended to distribute encrypted content to the terminal device 103. What is employed as the format of the content distributed by the content server 102 is a transport stream (referred to as TS, hereinafter) defined in the MPEG-2 (Moving Picture Expert Group 2) Systems (IEC/ISO13818-1), or the like.

The terminal device 103 is disposed at the user β side, and is intended to use the content distributed from the content server 102 by using the license distributed from the license server 101.

Examples of the transmission medium 104 include the Internet, wired communication media or wireless communication media such as CATV (Cable Television) and broad waves, and portable recording media. The transmission medium 104 is intended to connect the license server 101, the content server 102, the terminal devices 103 so that they can exchange data.

Figure 3:
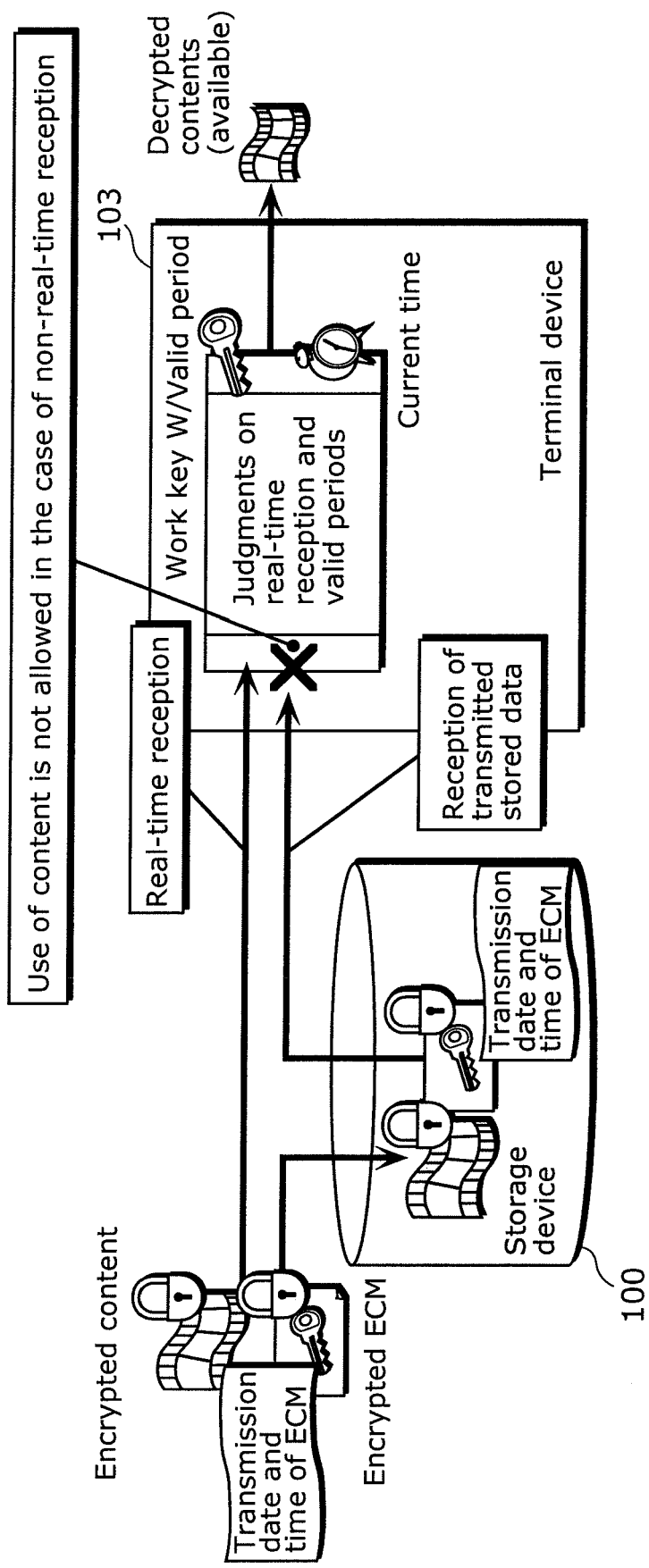
FIG. 3 is a block diagram showing the outline of the content distribution system according to the present invention.

It is to be noted that FIG. 3 is a block diagram showing the outline of the content distribution system 1 according to the present invention. As shown in FIG. 3, the content distribution system 1 principally allows the use of content only when the reception time of the content is approximately the same as the distribution time of encrypted content and an encrypted ECM from the distribution side server device (such reception is called "real-time reception") and the contract for the content has not yet expired. The content distribution system 1 does not allow the use of the content when the content has been temporarily stored in the storage device 100 and thus is being received not in real time. Here, when the difference between the distribution time and the reception time is, for example, "within 30 minutes", such reception can be called "real-time reception".

Figure 4:
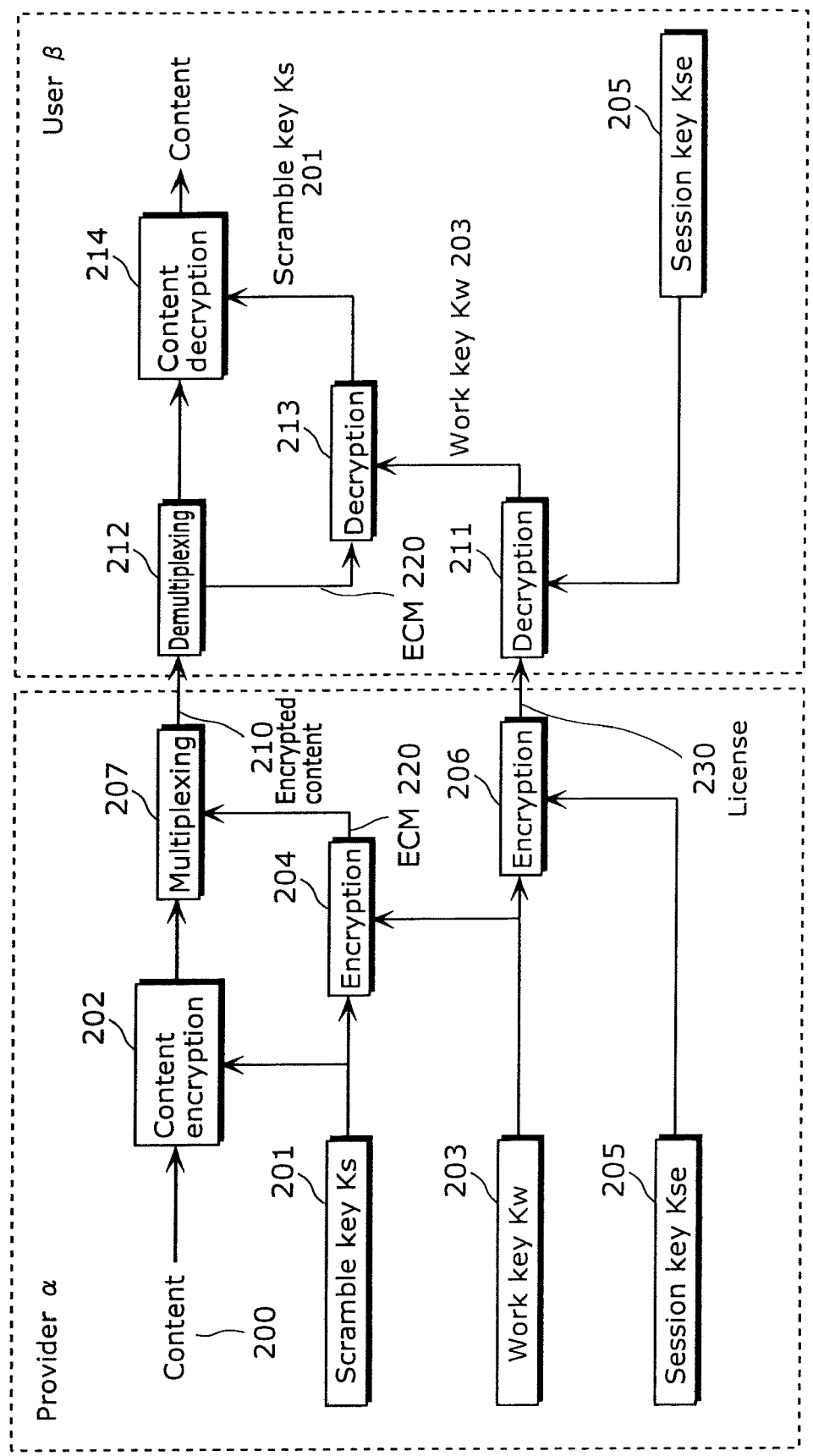
FIG. 4 is a diagram showing an encryption scheme performed on content in the content distribution system according to the present invention.

The description has been given above of the overall structure of the content distribution system 1 in this embodiment. With reference to FIG. 4, the next description is given of an encryption scheme performed on content to be distributed in the content distribution system 1 in this embodiment.

The provider side α and the user side β in FIG. 4 are described separately. The provider side α transmits encrypted content and an encryption key for decrypting the encrypted content, whereas the user side β receives the encrypted content and the encryption key.

In the provider side α, the content 200 is scrambled (that is, encrypted) by using the encryption key called a scramble key Ks 201 (S202). In the scrambling, the payloads of TS packets in MPEG-2 are scrambled on a per TS packet basis. It is to be noted that this scramble key Ks 201 is a time-variable key which is changed at a frequency, for example, ranging from few seconds to few days in order to increase the security against unauthorized reception.

The scramble key Ks 201 for encrypting the content 200 is encrypted (S204) by using the work key KW 203 in order to prevent unauthorized interception performed by a malicious user. The work key Kw 203 is an encryption key assigned on a basis of a provider, a contract, a group, or the like so that it can be used according to a conventional general limited reception method, and in general, it is updated after a period ranging from a month to few years in order to secure the security of the work key Kw 203 itself. The work key Kw 203 includes at least a scramble key Ks 201. The data structure for transmitting the content-related information is called ECM (Entitlement Control Message) 220 structured as private sections defined in the MPEG-2 Systems. It is to be noted that an example of the data structure of this ECM 220 is described in detail later with reference to the drawings.

The work key Kw 203 which encrypts the ECM 220 including the scramble key Ks 201 must be shared among the provider α side and the user β side prior to the use of the content. As shown in FIG. 4, such sharing is achieved by generating the encrypted work key Kw 203 in the license 230 and distributing the license 230 from the provider α side to the user β side through a SAC. More specifically, the session key Kse 205 is shared among them when the SAC is established between the provider α side and the user β side, and thus the provider α side encrypts (S206) the license 230 by using the session key Kse 205.

It is to be noted that a common key encryption method such as AES (FIPS-197) is generally used as an encryption algorithm used in this encryption scheme.

The encrypted content generated and the ECM 220 encrypted as described above are converted into TS packets in MPEG-2, multiplexed (S207) with data such as PSI (Program Specific Information)/SI (Service Information) and the like as necessary, and then transmitted to the user β side.

On the other hand, the user β side receives, prior to the use of the content 200, the license 230 including the work key Kw 203 encrypted (S206) by using the session key Kse 205 at the provider α side and then transmitted, and decrypts (S211) the received license by using the session key Kse 205 shared with the provider α side through the SAC to obtain the work key Kw 203.

Further, when the user β side receives the MPEG-2 TS packets including the encrypted content from the provider α side, the user β demultiplexes (S212) the TS packets to obtain the encrypted content 210, the encrypted ECM 220, and the like. Next, the user β side decrypts (S213) the encrypted ECM 220 by using the obtained work key Kw 203 to obtain the scramble key Ks 201. At this time, the user β side obtains the scramble key Ks 201 from the ECM 220, and makes a judgment on the availability. This judging process is described in detail later with reference to the drawings.

Next, the user β side descrambles (that is decrypting) (S214) the encrypted content 210 by using the obtained scramble key Ks 201 so that the user β can use (view, write, or the like) the content.

Figure 5:
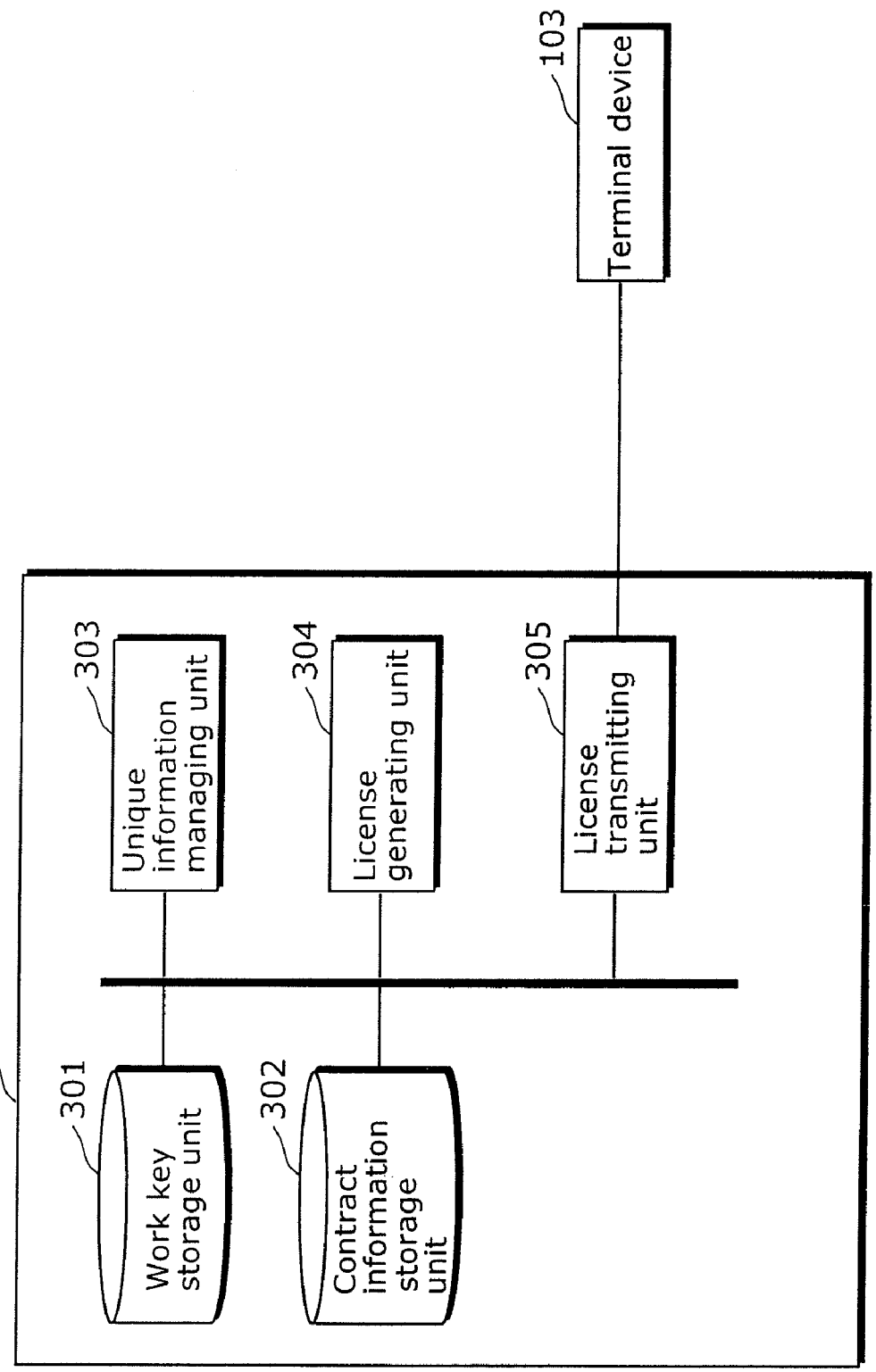
FIG. 5 is a diagram showing the functional structure of a license server according to the present invention.

FIG. 5 is a block diagram showing the functional structure of the license server 101 in this embodiment. In FIG. 5, the license server 101 includes a work key storage unit 301, a contract information storage unit 302, a unique information managing unit 303, a license generating unit 304, and a license transmitting unit 305. The respective structural elements are described below.

The work key storage unit 301 is, for example, a RAM, and stores the work key Kw 203. It is assumed that the work key storage unit 301 stores the work key Kw 203 together with an identifier uniquely identifying the work key Kw 203 within the content distribution system 1, the work key transmission starting date, and the like, and that the identifier identifies the work key Kw 203 which should be transmitted to the terminal device 103.

The contract information storage unit 302 is used for managing the contract information which is required for the user β who uses this content distribution system to use the content. Here, examples of "contract information" include information for associating the user β and the terminal device 103, information for identifying the service for which the user β made a contract, and information including the starting point and ending point of the valid period of the contract.

The unique information managing unit 303 is, for example, a micro computer including a ROM or the like for storing a control program, and is used for controlling the overall functions of the license server 101. Further, the unique information managing unit 303 manages the unique information of the license server 101, and holds unique information such as a secret key of the license server 101 required to establish a SAC to the terminal device 103 and public key certificate of the license server 101.

The license generating unit 304 generates the license 230 to be distributed to the terminal device 103 in response to a request from the terminal device 103.

The license transmitting unit 305 establishes the SAC to the terminal device 103, and transmits the license 230 generated by the license generating unit 304 to the terminal device 103 in response to the request from the terminal device 103.

The description has been given above of the overall structure of the license server 101 in this embodiment.

Figure 6:
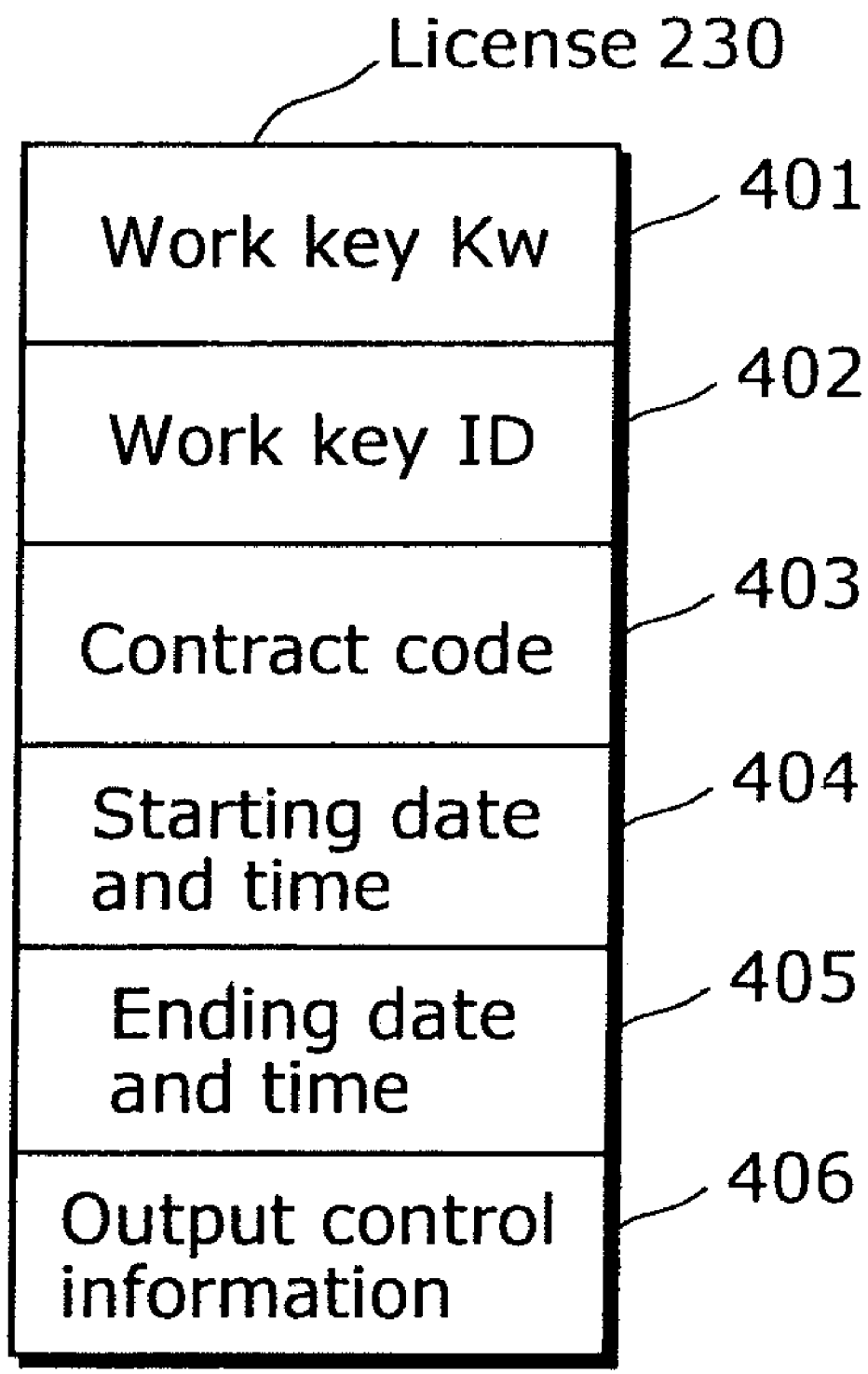
FIG. 6 is a diagram showing an example of a license generated by a license generating unit in the license server according to the present invention.

FIG. 6 is a diagram showing an example of the license 230 generated by the license generating unit 304 of the license server 101. As shown in FIG. 6, the license 230 includes a work key Kw 401, a work key ID 402, a contract code 403, a starting date and time 404, an ending date and time 405, and output control information 406.

The work key Kw 203 shown in FIG. 4 is generated in the work key Kw 401. It is to be noted that, when the work key Kw 203 is updated periodically, it is possible to generate the current work key Kw 203 and the updated work key Kw 203 as the work keys Kw 401 in the license 230. The ID uniquely identifying the work key Kw 203 to be generated in the work key Kw 401 is generated in the work key ID 402. A code indicating the contract information made for the user β who uses the terminal device 103 is generated in the contract code 403. This code is also called tier bits. The starting point at which the work key Kw 401 can be used is generated in the starting date and time 404. In the ending date and time 405, the ending point at which the use right of the work key Kw 401 is lost. Information related to digital outputs, analog outputs, recording on a recording medium such as a removable media, and storage control at the time when content is used is generated in the output control information 406. Examples of such information include digital/analog copy control information (referred to as "CCI" hereinafter), analog copy protection system, EPN (encryption plus non-assertion), and information related to temporary storage. Specific examples of such information to be generated as copy control information include "Copy never", "Copy once", "Copy Free" and the like.

The description has been given above of an example of the license 230 in this embodiment.

Figure 7:
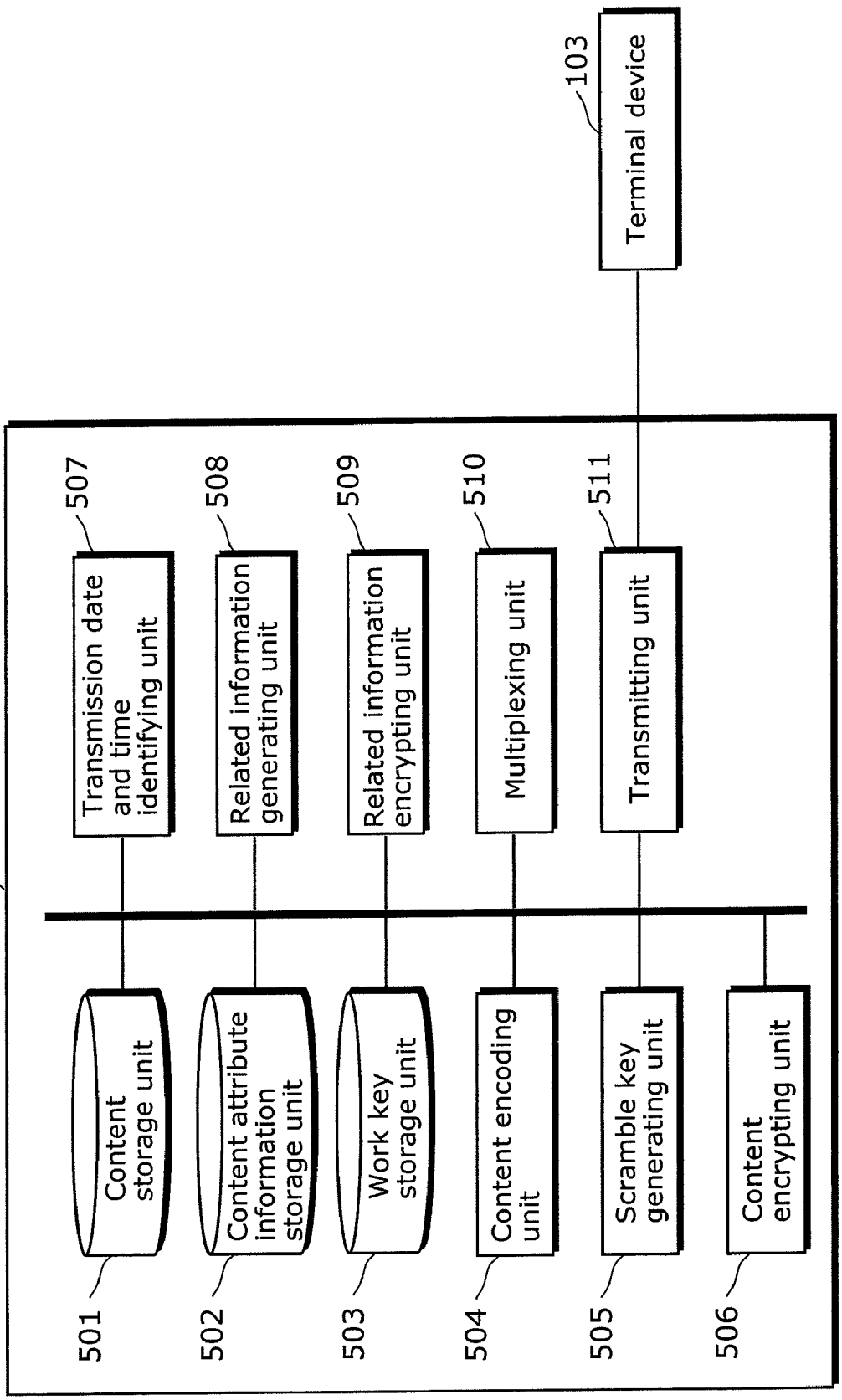
FIG. 7 is a block diagram showing the functional structure of the content server according to the present invention.

FIG. 7 is a block diagram showing the functional structure of the content server 102 in this embodiment. As shown in FIG. 7, the content server 102 includes a content storage unit 501, a content attribute information storage unit 502, a work key storage unit 503, a content encoding unit 504, a scramble key generating unit 505, a content encrypting unit 506, a transmission date and time identifying unit 507, a related information generating unit 508, a related information encrypting unit 509, a multiplexing unit 510, and a transmitting unit 511.

The content storage unit 501 is a hard disk device, a DVD recorder, or the like, and stores content. Further, it is assumed that an identifier for uniquely identifying content within the content distribution system 1, the name of the content, the distribution date and time of the content, or the like are stored in the content storage unit 501.

The content attribute information storage unit 502 is a RAM or the like, and stores information regarding content. Further, it is assumed that an identifier for uniquely identifying content within the content distribution system 1, information identifying a contract required to use the content, or the like are stored in the content attribute information storage unit 502.

The work key storage unit 503 is, for example, a RAM, and stores an encryption key for encrypting an ECM 220. Further, it is assumed that the work key storage unit 503 stores the work key Kw 203 and the work key ID 402 together with the work key use starting date and the like, and the work key Kw 203 which should be applied to the ECM 220 can be identified according to the transmission time.

The content encoding unit 504 reads the content to be transmitted to the terminal device 103 from the content storage unit 501, and encodes the content in MPEG format. Further, the content encoding unit 504 is a real-time encoder which generates an MPEG stream, and reads video, audio, and the like from the content storage unit 501 according to an instruction by an upstream system (for example, a program schedule management system), and generates an MPEG-2 or H.264 ES (Elementary Stream) including the video and audio. Further, the content encoding unit 504 generates PES (Packetized Elementary Stream) packets including these ESs, converts the PES packets into the MPEG-2 TS packets lastly, and transmits the TS packets to the multiplexing unit 510.

The scramble key generating unit 505 generates a scramble key Ks 201 for scrambling the content. Further, the scramble key generating unit 505 sequentially generates scramble keys Ks 201 based on the update period of the scramble keys Ks 201, and transmits them to the content encrypting unit 506.

The content encrypting unit 506 scrambles the content. Further, the content encrypting unit 506 encrypts (scrambles) the payloads of the TS packets, by using the scramble key Ks 201 obtained from the scramble key generating unit 505, and the AES or the like, in CBC (cipher block chaining) mode plus OFB (output feed back) mode.

The transmission date and time identifying unit 507 is, for example, a micro computer including a ROM for storing a control program, and controls the overall functions of the content server 102. Further, the transmission date and time identifying unit 507 is a unit for managing time information and provides the current time to the unit which requires such time information.

The related information generating unit 508 generates, in the content-related information (ECM 220), content decryption keys (in particular, in plural number) for decrypting the encrypted content. More specifically, the related information generating unit 508 generates an ECM 220 including the scramble key Ks 201 generated in the scramble key generating unit 505. Further, the related information generating unit 508 generates an ECM 220 according to an instruction from the upstream system, at the timings of the transmission of the content and the obtainment of the scramble key Ks 201 from the scramble key generating unit 505. The generated ECM 220 is transmitted to the multiplexing unit 510.

The related information encrypting unit 509 encrypts the ECM 220 generated by the related information generating unit 508. The related information encrypting unit 509 receives the ECM 220 from the related information generating unit 508, and encrypts the EMC 220 by using the work key Kw 203 obtained from the work key storage unit 503. AES or the like, and CBC plus OFB as the encryption mode are used for encrypting the ECM 220. Further, the related information encrypting unit 509 transmits the ECM 220 encrypted in this way to the multiplexing unit 510.

The multiplexing unit 510 multiplexes the TSs including the video, audio, and data received from the content encrypting unit 506 with the TSs of the ECM 220 received from the related information encrypting unit 509 to generate multiplexed TSs.

The transmitting unit 511 transmits the TSs generated by the multiplexing unit 510 to the terminal device 103. For example, the content transmitting unit 511 multicasts the TSs on the IP (Internet Protocol) network to transmit them to the terminal device 103.

The description has been given above of the overall functions of the content server 102 in this embodiment.

FIG. 8(a) is a diagram showing an example of the ECM 220 generated by the related information generating unit 508. As shown in FIG. 8(a), the ECM 220 includes a format version 601, a work key ID 602, a transmission date and time 603, a contract judgment code 604, private data 605, a scramble key (odd) 606, and a scramble key (even) 607.

Information for identifying the format of the ECM 220 and the encryption method of the ECM 220 is generated in the format version 601.

Information for identifying the work key Kw 203 for encrypting the ECM 220 is generated in the work key ID 602. The work key ID 602 is generated in the non-encryption portions of the ECM 220, and thus it is possible to identify the work key Kw 203 which should be used for decrypting the ECM 220 encrypted by the terminal device 103 by referring to the work key ID 602 when decrypting the ECM 220. In the work key ID 602, a code identifying the provider of the service, and information identifying the pair of work keys (even/odd) Kw 203 may be included.

The current time obtained from the transmission date and time identifying unit 507 is generated in the transmission date and time 603. In other words, the ECM 220 and the transmission date and time of the content are generated in the transmission date and time 603.

The contract judgment code 604 is information indicating the attribute of the content, and is used for judging whether or not a contract for viewing the content has been made at the time of viewing of the content by using the terminal device 103.

The private data 605 is a field in which an arbitrary data can be generated. In this embodiment, the private data 605 is generated as padding for securing an alignment with the encryption block length. It is to be noted that output control information 615 may be stored as a portion of the private data 605 as shown in FIG. 8(b). This output control information 615 has the same data structure as that of the output control information 406 in the license 230 in FIG. 6. A value which is the same as or different from that in the output control information 406 can be generated therein. When the output control information 615 is generated as the portion of the private data 605, which one of the output control information 406 and the output control information 615 is prioritized is determined according to a predetermined rule. In this embodiment, it is assumed that the terminal device 103 basically prioritizes the output control information 615. It is to be noted that the present invention is not limited by this assumption. For example, it is good to refer both of them, and to apply one of them which has less strict restrictions or which has stricter restrictions in the case where the values are different from each other.

A scramble key Ks 201 for encrypting the payloads of the TS packets of content is generated in the scramble key (odd) 606.

The scramble key Ks 201 for encrypting the payloads of the TS packets of the content, likewise the scramble key (odd) 606 is generated in the scramble key (even) 607. Transmitting the scramble keys (odd/even) Ks 201 in the ECM 220 allows the terminal device 103 to continuously use the content even when the scramble keys Ks 201 are switched.

Here, the format version 601 and the work key ID 602 in the ECM 220 are data which are not encrypted, whereas the transmission date and time 603, the contract judgment code 604, the private data 605, the scramble key (odd) 606, the scramble key (even) 607 are data to be encrypted by using AES in CBC mode. In addition, it is assumed that the OFB mode is concurrently used at the time of occurrence of a fractional figure less than the encryption block length (for example, 16 bytes in the AES having a 128-bit key length). It is assumed that a fixed value is used as the value of IV (initialization vector) in CBC mode, and is unique to a device (cannot be changed from outside) at least within the terminal device 103.

Here, data arrangement of the encryption portions in the ECM 220 is described in further detail with reference to FIG. 9.

Figure 9:
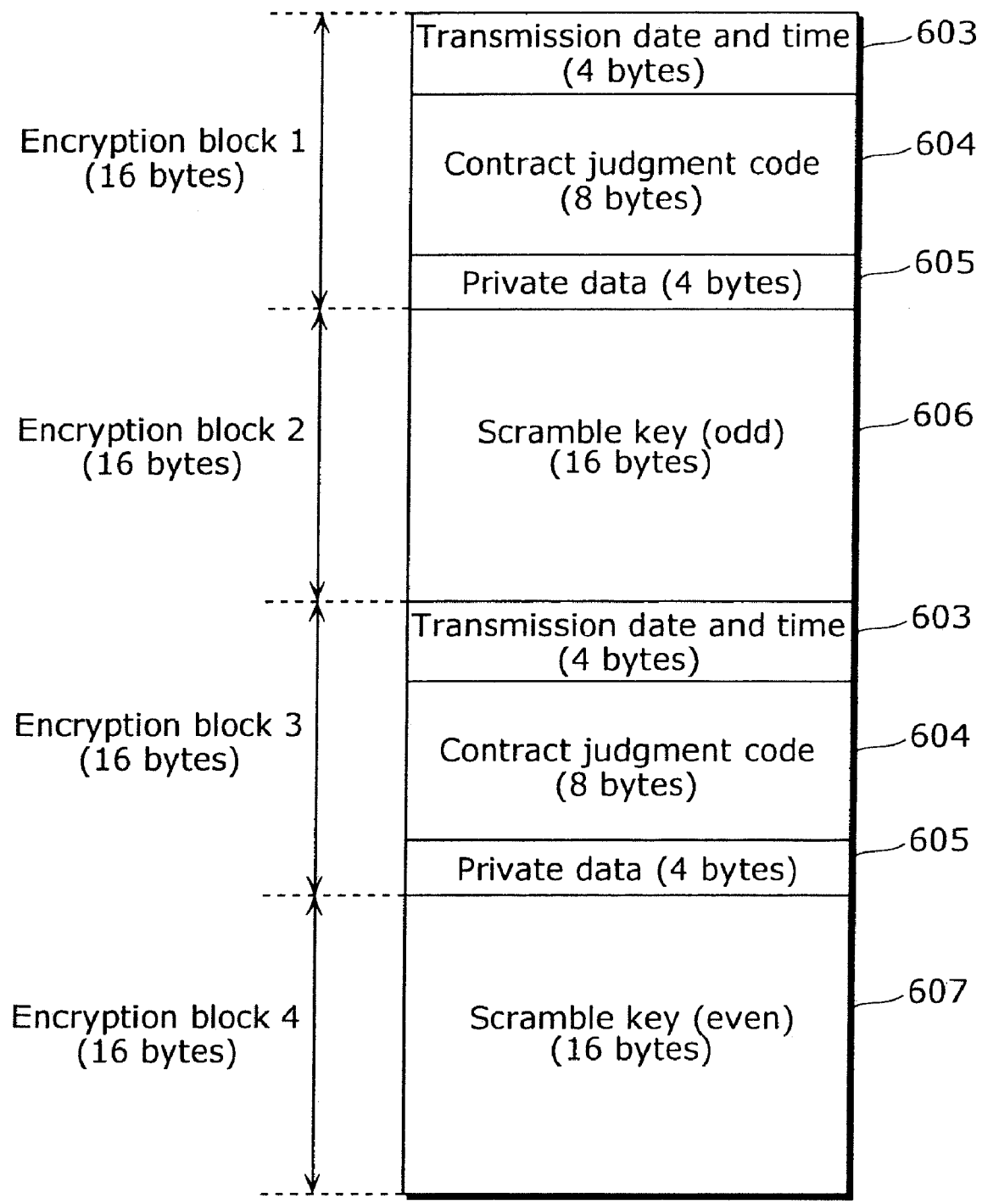
FIG. 9 is a diagram showing data arrangement of encryption portions in an ECM according to the present invention.

FIG. 9 is a diagram showing the details of the encryption portions (the portions to be encrypted) of the ECM 220 shown in FIG. 8, and a transmission date and time 603, a contract judgment code 604, and a private data 605 are generated in each of the encryption blocks 1 and 3. A scramble key (odd) 606 is generated in the encryption block 2, and a scramble key (even) 607 is generated in the encryption block 4 in the given example.

The data which should be protected from falsification by an unauthorized user or the like in the ECM 220 is the transmission date and time 603 and the contract judgment code 604 relating to the judgment, made by the terminal device 103, on the availability of content.

With reference to FIG. 10A, a description is given of an example of a consistency judging process performed for each bit by using the contract judgment code 604 of the ECM 220 and the contract code 403 of the license 230 in the terminal device 103.

Figure 10:
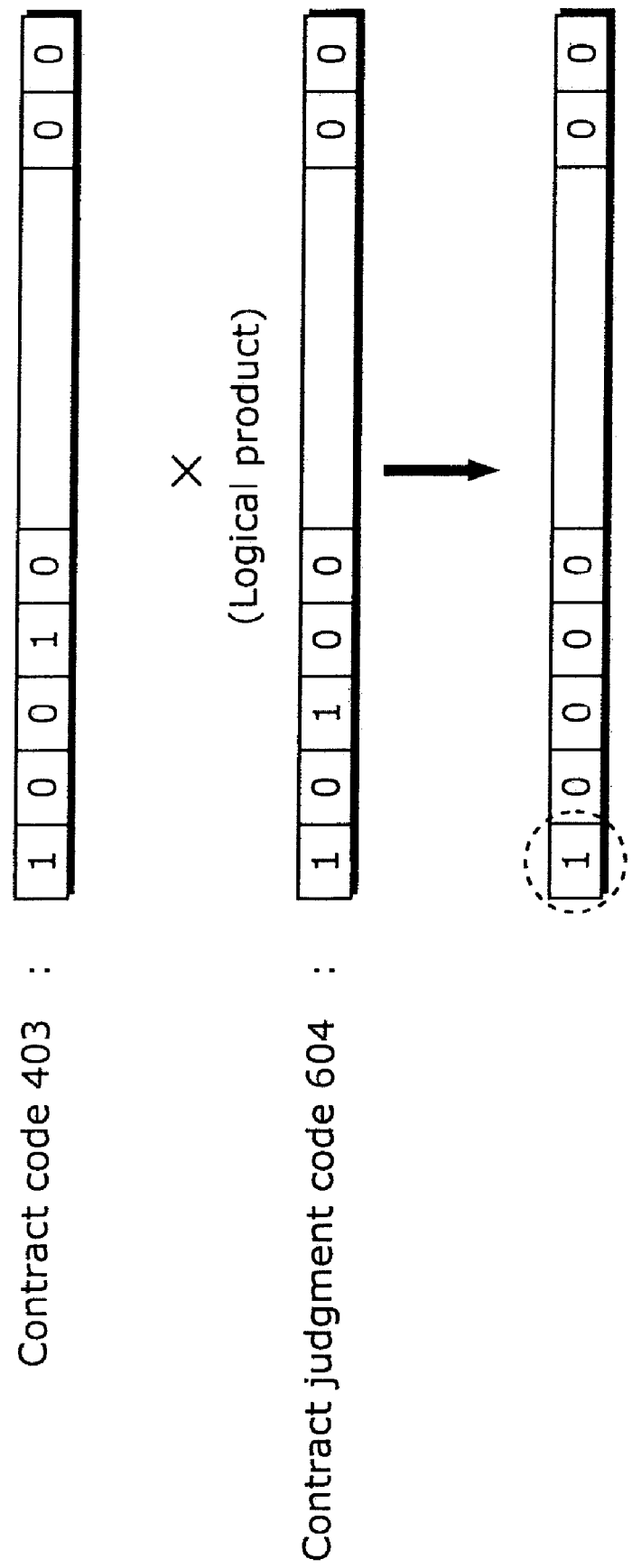
FIG. 10 is a diagram showing a procedure of a contract information judging process performed based on a contract code and a contract judgment code according to the present invention.

As shown in FIG. 10, the contract judgment code 604 is bit arrangement (bit map) in which services are associated with bits one-by-one. The bit corresponding to the service belonging to the content including the ECM 220 is set to "1", and the other bits are set to "0". On the other hand, in the contract code 403, services are associated with bits in the same manner. The bit corresponding to the service for which the user β has made a contract is set to "1", and "0" is set for the services for which the user β has not made a contract.

When the terminal device 103 receives the ECM 220, it calculates the logical product (AND) of the contract judgment code 604 and the contract code 403. The terminal device 103 judges that "a contract exists" when the result shows that any of the bits is "1", and judges as "no contract" when the result shows that all of the bits are "0".

The terminal device 103 performs a contract information judging process based on the contract judgment code 604 of the ECM 220 and the contract code 403 of the license 230 by using an extremely simple method of a consistency judging process performed for each bit in this way. Thus, in the case where a partly falsified encrypted ECM 220 is decrypted, the value of the contract judgment code 604 becomes different from the due value indicating the contract. This disables a correct judgment on the contract information, which may lead to unauthorized use of the content. Likewise, there is a possibility that a correct judgment on the contract information cannot be made based on the transmission date and time 603 due to falsification on the encrypted ECM 220, which may lead to unauthorized use of the content.

For this, in FIG. 9 in this embodiment, data included in the ECM 220 is protected from falsification by using the feature of chaining blocks in CBC mode. In other words, the CBC mode is characterized in that two adjoining encrypted blocks are chained in the decryption, and thus when a specific bit in a given encryption block is reversed, the reverse may affect all the bits of the block or affects only the bits corresponding to the succeeding encryption block. In FIG. 9, the transmission date and time 603 and the contract judgment code 604 are substantially protected from falsification because the obtainment of the correct scramble key Ks 201 is disabled (in other words, content cannot be used because the content cannot be correctly decrypted) in the case of falsification by arranging data which causes damage to an unauthorized person (in this embodiment, it is the scramble key Ks 201 for decrypting the content) at the block positioned next to the encryption block including data which should be protected from such falsification (in this embodiment, it is a transmission date and time 603 and a contract judgment code 604).

In addition, the result of decryption of the encryption block in which bit reverse has been performed may affect all the bits in the encryption block, whereas only the reversed bit is affected in the succeeding encryption block. In view of this, in FIG. 9, the private data 605 is arranged in such a manner that the scramble key Ks 201 is aligned with the boundary between the encrypted blocks. In addition, in the case of applying an AES having a 128-bit length as an algorithm to be applied to the content and the ECM 220, each of the encryption block length and the scramble key length is 16 bytes, and as shown in FIG. 8, the length of the scramble key Ks 201 is the same as the length of a single encryption block. Thus, it is possible to employ a structure which prevents an unauthorized person from obtaining a correct scramble key Ks 201 even in the case of reversing any one of the bits in the encryption block immediately preceding the block of the scramble key Ks 201.

Further, since the ECM 220 includes the scramble key (odd) 606, the scramble key (even) 607, and two scramble keys Ks 201, there is a possibility that one of the correct scramble keys 201 cannot be obtained while the other one can be obtained in the case where a falsification trial is performed on the transmission date and time 603 and the contract judgment code 604 even when the feature of chaining blocks in CBC mode is simply utilized. This may lead to unauthorized use of the content. For this, in FIG. 9, the transmission date and time 603 and the contract judgment code 604 are arranged in each of the encryption block 1 and the encryption block 3 which are the encryption blocks immediately preceding the encryption block 2 for the scramble key (odd) 606 and the encryption block 4 for the scramble key (even) 607, arranges the encryption blocks 1 to 4 as a sequence of encryption blocks, and generates the same value to the transmission date and time 603 and the contract judgment code 604 of each of the encryption blocks 1 and 3. The terminal device 103 can detect falsification even when at least one of the two transmission dates and times 603 and the contract judgment codes 604 has been falsified by judging whether or not the two transmission dates and times 603 are identical and the two contract judgment codes 604 of the decrypted ECM 220 are identical. In addition, there is a provided advantageous effect of being able to detect falsification prior to the process of obtaining the scramble key Ks 201 by making a judgment on the consistency of the two contract judgment codes 604.

In this embodiment, the use of the ECM 220 configured as described above eliminates processing such as MIC (Message Integrity Check) which requires a large amount of calculation, and only requiring an encrypting process and a simple data consistency judging process to substantially prevent falsification on the ECM 220. It is not necessary to use a special encryption mode or the like in the encrypting process, and the CBC mode which is a standard encryption mode can be used. In addition, it is only necessary to make a judgment on the consistency of data which must be protected from falsification in the encryption blocks (in this embodiment, the transmission dates and times 603, and the contract judgment codes 604) in the data consistency judging process. Accordingly, it is considered that the scheme shown in this embodiment can be very easily implemented.

The description has been given above of the data arrangement of the encryption portions in the ECM 220 in this embodiment.

Figure 11:
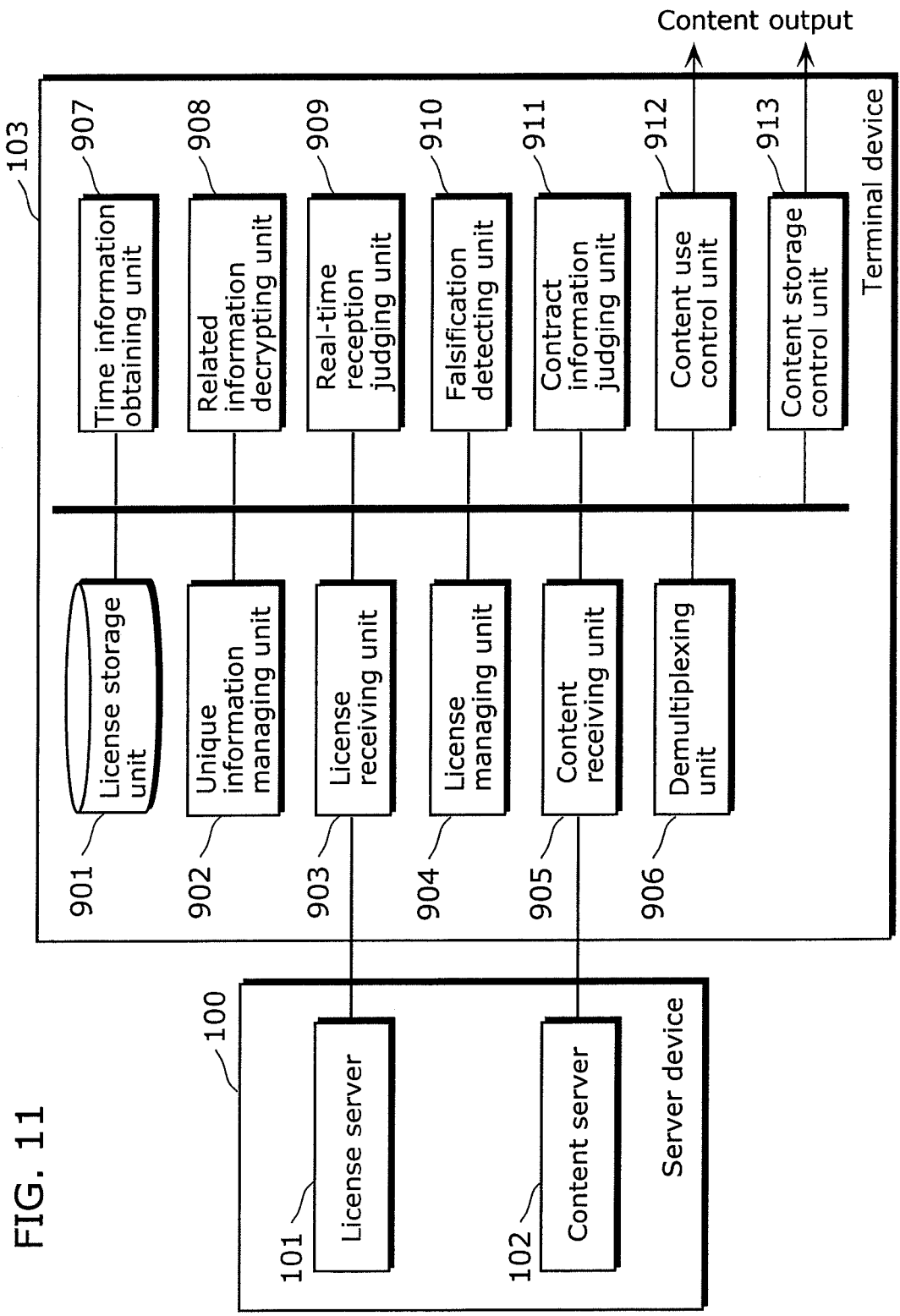
FIG. 11 is a block diagram showing the structure of the terminal device according to the present invention.

FIG. 11 is a block diagram showing the functional structure of the terminal device 103 in this embodiment. As shown in FIG. 11, the terminal device 103 includes a license storage unit 901, a unique information managing unit 902, a license receiving unit 903, a license managing unit 904, a content receiving unit 905, a demultiplexing unit 906, a time information obtaining unit 907, a related information decrypting unit 908, a real-time reception judging unit 909, a falsification detecting unit 910, a contract information judging unit 911, a content use control unit 912, and a content storage control unit 913. The respective structural elements are described below.

The license storage unit 901 stores the license 230 received by the license receiving unit 903. Here, in order to allow only the terminal device 103 to use the license 230, it is general that the license 230 is encrypted according to a local encryption and then stored.

The unique information managing unit 902 manages the information unique to the terminal device 103, and holds the unique information such as a secret key of the terminal device 103 required to establish a SAC with the license server 101 and a public key certificate of the terminal device 103.

The license receiving unit 903 receives the license 230 from the license server 101 through the SAC.

The license managing unit 904 manages the license 230 stored in the license storage unit 901.

The content receiving unit 905 receives the content from the content server 102 via an IP network or the like. The content receiving unit 905 obtains TSs from the received content, and transmits the TSs to the demultiplexing unit 906.

The demultiplexing unit 906 is a unit for obtaining multiplexed encrypted content from an MPEG-2 TS, and demultiplexing the content from the ECM 220 and the like. The demultiplexing unit 906 obtains the video and audio of the content and the PID of each TS packet including the ECM 220 with reference to the PSI information such as PAT (Program Association Table) and PMT (Program Map Table) included in the TS received by the content receiving unit 905.

The time information obtaining unit 907 manages a current time. It is assumed that the time information obtaining unit 907 is, for example, a clock capable of accurately managing a current time within the terminal device 103, or as appropriate, a clock, a timer or the like which operates based on the current time obtained from a reliable server on a network through a TOT (Time Offset Table) in broadcasting via a secure communication path. In addition, a priority may be applied to these pieces of reliable time information in the obtainment. In this embodiment, it is assumed that the time information obtaining unit 907 obtains reliable time information from a time server on the network through a time information obtaining unit not shown in FIG. 11, and keeps time based on the obtained time information.

The related information decrypting unit 908 decrypts the ECM 220 by using the work key Kw 203. More specifically, the related information decrypting unit 908 obtains the license 230 having a corresponding work key ID 402 from the license storage unit 901 by referring to the work key ID 602 of the ECM 220 obtained from the demultiplexing unit 906, and in the case of having the license 230, decrypts the ECM 220 by using the work key Kw 203 generated in the work key Kw 401 in the license 230.

The real-time reception judging unit 909 judges whether or not the difference between the transmission date and time 603 generated in the ECM 220 and the current time obtained from the time information obtaining unit 907 is below a predetermined value, and based on the result, judges whether or not the content received by the content receiving unit 905 is being received in real time (whether or not the content is currently being transmitted from the content server 102).

In the general methods for judging such valid periods according to the conventional limited reception methods, the transmission date and time included in an ECM is compared with the valid period of a contract held in the terminal device. However, according to such methods, it is possible to constantly use (view, or write) content several times in the case where the transmission date and time included in an ECM is a value within the contract valid period. Application of such methods to broadcast services according to the IP scheme (called IP multicast broadcasting, IP broadcasting, or the like) entails a problem that content can be used several times in an unauthorized manner by obtaining the content through a PC (Personal Computer) or the like in a relatively simple manner, storing the content, and inputting the stored content in the terminal device 103 several times. Thus, in this embodiment, whether or not the content is being received in real time by checking the transmission date and time 603 included in the ECM 220 by using the current time obtained from a reliable source. This makes it possible to limit the use of the content at the time of real-time reception to only once, and thereby preventing the use of the stored content in the case where the content is inputted (re-transmitted) several times. In addition, it is actually difficult to accurately synchronize the current time managed by the time information obtaining unit 907 and the date and time of the transmission date and time 603. Thus, in this embodiment, an error range allowable in the real-time reception judging process performed by the real-time reception judging unit 909 is held in advance, and when the difference between the current time managed by the time information obtaining unit 907 and the date and time of the transmission date and time 603 falls within the allowable error range, the content is judged as being received in real time.

The falsification detecting unit 910 detects falsification of an ECM 220 by making a consistency judgment on whether or not the two transmission dates and times 603 and two contract judgment codes 604 generated in the ECM 220 are respectively identical.

The contract information judging unit 911 can decrypt the ECM 220 as the result of the processes performed by the related information decrypting unit 908, the real-time reception judging unit 909, and the falsification detecting unit 910. In addition, in the case where the validity of the ECM 220 is verified (in other words, the ECM 220 has not been falsified, and thus valid), the contract information judging unit 911 makes a judgment on the availability of the scramble key Ks 201 based on the license 230 and the ECM 220 obtained from the license managing unit 904. Further, when the contract information judging unit 911 judges that the use of the scramble key Ks 201 is allowed, as the result of the judgment on the availability, it notifies the content use control unit 912 or the content storage control unit 913 of the fact and transmits the scramble key Ks 201 thereto.

The content use control unit 912 reproduces the received content. Further, when the content use control unit 912 receives the scramble key Ks 201 as the result of processes performed by the related information decrypting unit 908, the real-time reception judging unit 909, the falsification detecting unit 910, and the contract information judging unit 911, it decrypts the content received from the content receiving unit 905 by using the obtained scramble key Ks 201, and performs a reproducing process. At this time, the content use control unit 912 controls digital reproduction output/analog reproduction output, based on the output control information 406 obtained from the license managing unit 904.

The content storage control unit 913 is a unit which writes the received content on an internal or external recording medium or the like. Further, the content storage control unit 913 can receive the scramble key Ks 201 as the result of processes performed by the related information decrypting unit 908, the real-time reception judging unit 909, the falsification detecting unit 910, and the contract information judging unit 911. Further, in the case where the output control information 406 obtained from the license managing unit 904 allows such writing, the content storage control unit 913 decrypts the content received from the content receiving unit 905 by using the obtained scramble key Ks 201, converts the decrypted content into a predetermined format according to the recording medium as the writing destination, and encrypts and writes the content.

Next, a description is given of operations of the content distribution system 1 in this embodiment with reference to the flowchart.

Figure 12:
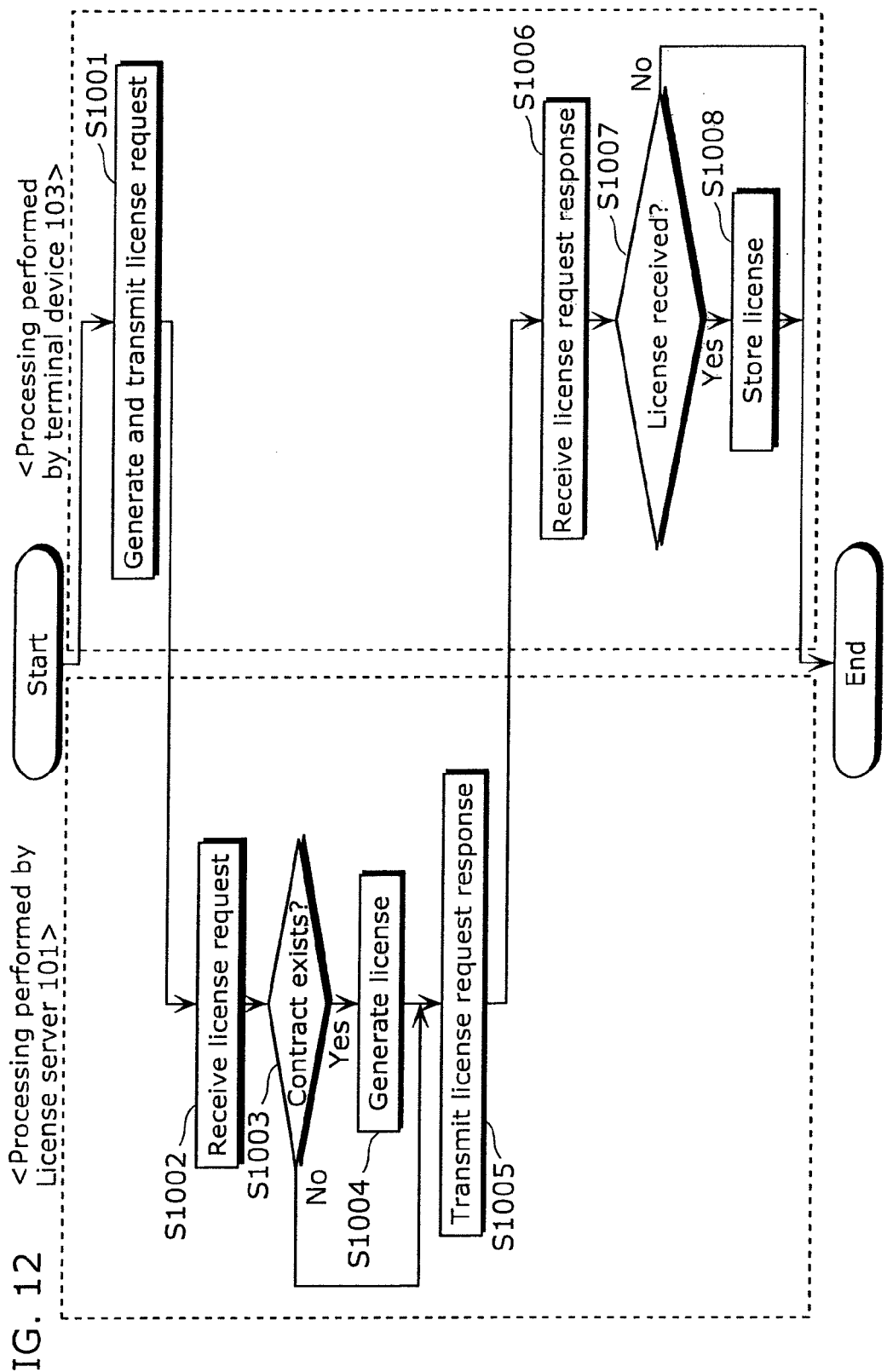
FIG. 12 is a flowchart of the operations performed in license transmission and reception according to the present invention.

First, with reference to the flowchart of FIG. 12, a description is given of how the terminal device 103 in this embodiment receives a license 230 from the license server 101.

S1001: The license managing unit 904 generates a license request requesting the license server 101 to provide the license 230, and transmits the license request to the license receiving unit 903. The license receiving unit 903 transmits the license request to the license server 101 through a SAC.

S1002: The license transmitting unit 305 receives the license request from the terminal device 103. The license transmitting unit 305 transmits the received license request to the license generating unit 304.

S1003: The license generating unit 304 checks the contract status of the terminal device 103 authenticated through the SAC by using the contract information storage unit 302, and judges the presence/absence of the contract for the terminal device 103 (user β). More specifically, first, the license generating unit 304 obtains the identification information of the license requested for by the license request received in S1002, and checks whether or not the contract information for the terminal device 103 is stored in the contract information storage unit 302. In the case where the contract information is managed in the contract information storage unit 302, the license generating unit 304 further checks whether or not the contract has expired. When the result of the check shows that no contract information is stored in the contract information storage unit 302, or the contract has expired, the license generating unit 304 judges that the contract is not valid (no contract). On the other hand, when the contract information is stored in the contract information storage unit 302, and the contract has not expired, the license generating unit 304 judges that the contract is valid (a contract exists). When the judgment is "a contract exists" in this process, a transition to the process of S1004 is made. When the judgment is "no contract" in this process, a transition to the process of S1005 is made.

S1004: The license generating unit 304 generates the license 230 shown in FIG. 5. The license generating unit 304 obtains, from the work key storage unit 301, the work key Kw 401 and the work key ID 402 in FIG. 5, and generates them in the license 230. In addition, the license generating unit 304 obtains, from the contract information storage unit 302, information relating to the service contract made for the terminal device 103 (user β), and generates the contract code 403, the starting date and time 404, the ending date and time 405, and the output control information 406. The license generating unit 304 transmits the generated license 230 to the license transmitting unit 305.

S1005: The license transmitting unit 305 generates a response to the license request, and transmits the response to the terminal device 103. The license transmitting unit 305 generates a license request response including the license 230 in the case where the license generating unit 304 has generated the license 230 in S1004. Whereas, in the case where the license generating unit 304 has not generate the license 230 in S1004, the license transmitting unit 305 generates a license request response not including the license 230 but including information notifying that the license 230 cannot be transmitted.

S1006: The license receiving unit 903 receives a license request response from the license server 101.

S1007: The license managing unit 904 checks whether or not the license 230 has been received by referring to the response to the license obtainment request. In the case where the license 230 has been received, a transition to the process of S1008 is made. In the case where the license 230 has not been received, this processing is ended.

S1008: The license managing unit 904 stores the license 230 received in S1007 into the license storage unit 901.

The description has been given above of operations of the transmission and reception of a license in this embodiment.

Figure 13:
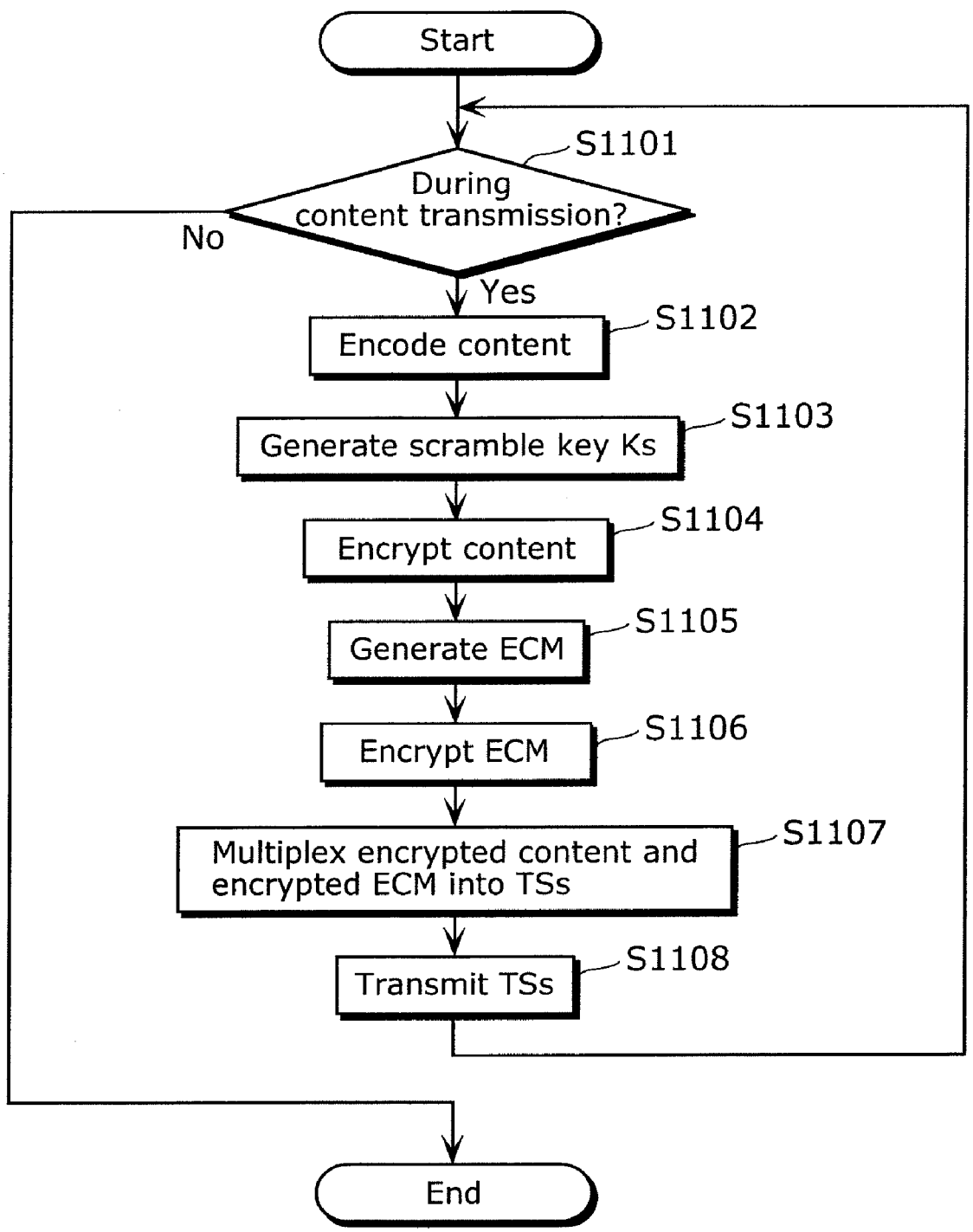
FIG. 13 is a flowchart of the operations performed in a content transmitting process according to the present invention.

Next, with reference to the flowchart of FIG. 13, a description is given of how the content server 102 performs an operation of transmitting content to the terminal device 103.

S1101: The content encoding unit 504 judges whether or not content is being transmitted according to an instruction by an upstream system (for example, a program operation managing system) or the like. More specifically, the content encoding unit 504 proceeds to the process of S1102 when the content encoding unit 504 does not receive, from the upstream system or the like, any instruction for canceling the coding and transmission of the content. When the content encoding unit 504 receives, from the upstream system or the like, an instruction for canceling the coding and transmission of the content, this processing is ended.

S1102: The content encoding unit 504 reads, from the content storage unit 501, the content specified by the upstream system or the like, encodes the content according to the MPEG-2, H. 264, or the like to generate TSs including the content. The content encoding unit 504 sequentially transmits the generated TSs to the content encrypting unit 506.

S1103: The scramble key generating unit 505 generates scramble keys Ks 201 based on random numbers according to their update periods, and transmits them to the content encrypting unit 506 and the related information generating unit 508.

S1104: The content encrypting unit 506 sequentially encodes the payloads of the respective TS packets of the content received from the content encoding unit 1102 by using the scramble keys Ks 201 received from the scramble key generating unit 505. It is to be noted that the content encrypting unit 506 switches the scramble keys Ks 201 for encrypting the TS packets according to the update periods of the scramble keys Ks 201, and at the same time, updates the values of transport_scrambling_control of the header portions of the respective TS packets according to the even/odd. The content encrypting unit 506 transmits the encrypted TSs to the multiplexing unit 510.

S1105: The related information generating unit 508 generates the ECM 220 shown in FIG. 7 at the timing of the transmission of the content. More specifically, the related information generating unit 508 obtains, from the work key storage unit 503, the work key ID 602 of the work key Kw 203 to be applied, and generates it in the ECM 220. Next, the related information generating unit 508 obtains a current time from the transmission date and time identifying unit 507, and generates the current time in the two transmission dates and times 603. Next, the related information generating unit 508 obtains the attribute information of the content from the content attribute information storage unit 502, generates a contract judgment code 604 for judging whether or not the content can be used in the terminal device 103, and generates it in the ECM 220 as the two contract judgment codes 604. Further, as shown in FIG. 8, the related information generating unit 508 inserts private data 605 to the ECM 220 in order to generate the scramble key (odd) 606 and the scramble key (even) 607 in such a manner that the scramble key (odd) 606 and the scramble key (even) 607 are aligned with the encryption block succeeding the encryption block including the transmission date and time 603 and the contract judgment code 604. Lastly, the related information generating unit 508 obtains the scramble key (odd) 606 and the scramble key (even) 607 from the scramble key generating unit 505, and generates them in the ECM 220. The related information generating unit 508 transmits the generated ECM 220 to the related information encrypting unit 509.

S1106: The related information encrypting unit 509 obtains the corresponding work key Kw 203 from the work key storage unit 503 by referring to the work key ID 602 of the ECM 220 received from the related information generating unit 508, and encrypts the encryption portions of the ECM 220 in the CBC mode. The related information encrypting unit 509 converts the encrypted ECM 220 into TS packets, and then transmits them to the multiplexing unit 510.

S1107: The multiplexing unit 510 multiplexes the TSs of the received encrypted content and ECM 220, and then transmits them to the transmitting unit 511.

S1108: The transmitting unit 511 transmits the TSs received from the multiplexing unit 510 to the terminal device 103, and then proceeds to the process of S1101.

The description has been given above of operations of the content transmitting process in this embodiment.

Figure 14:
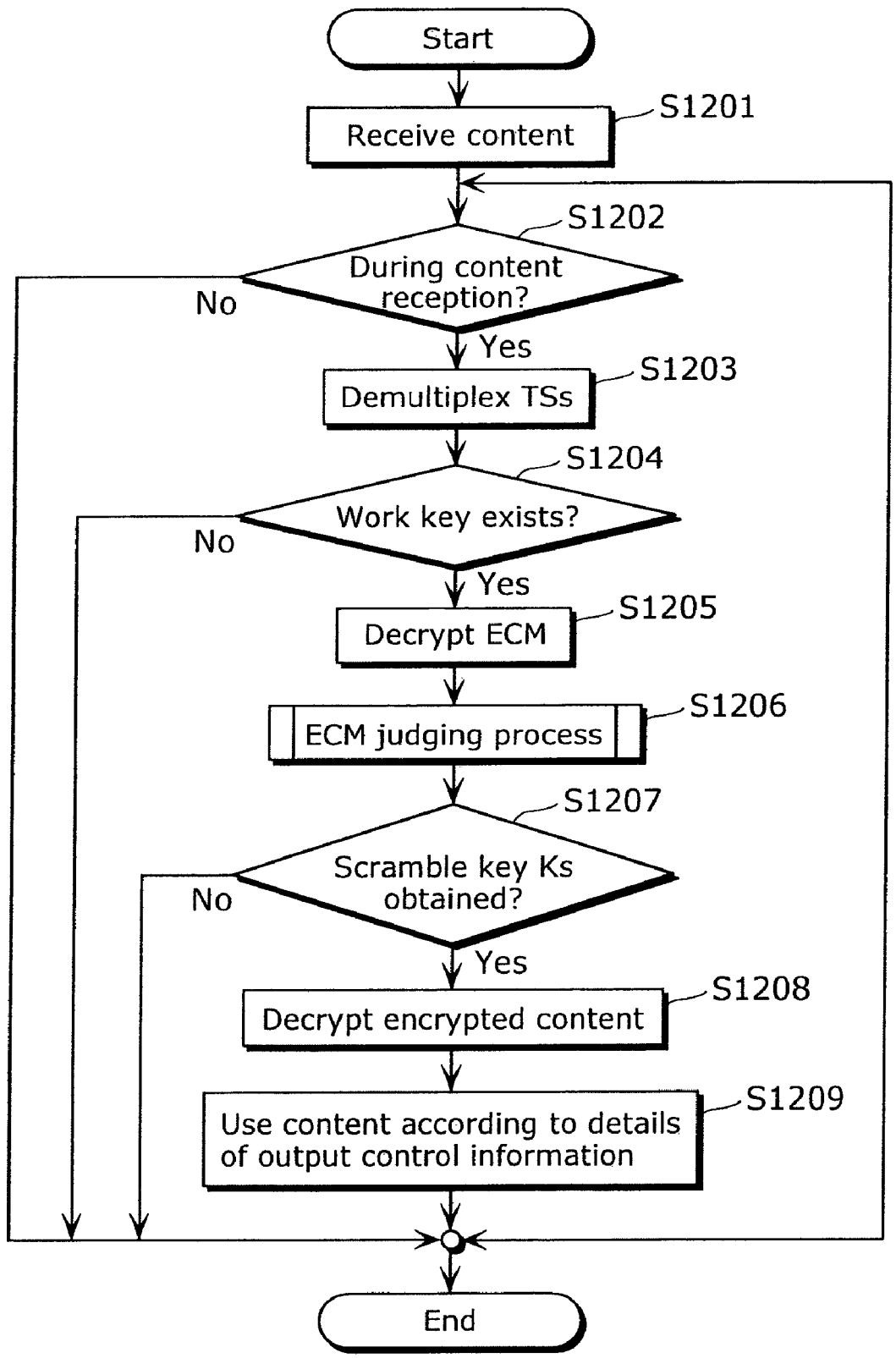
FIG. 14 is a flowchart of the operations performed in a content receiving process according to the present invention.

Next, with reference to the flowchart of FIG. 14, a description is given of how the terminal device 103 in this embodiment receives content transmitted from the content server 102.

S1201: The content receiving unit 905 receives content transmitted from the content server 102. The received content is converted into TSs, and the TSs are sequentially transmitted to the demultiplexing unit 906.

S1202: The content receiving unit 905 checks whether or not the content from the content server 102 is being received. When the content is being received, a transition is made to the process of S1203. On the other hand, when the content is not being received, this processing is ended.

S1203: The demultiplexing unit 906 demultiplexes the TSs received from the content receiving unit 905 into an ECM 220 and TS packets. The demultiplexing unit 906 transmits the demultiplexed content to the content use control unit 912 or the content storage control unit 913, and transmits the demultiplexed ECM 220 to the related information decrypting unit 908.

S1204: The related information decrypting unit 908 checks whether or not the license 230 including the work key Kw 203 from the license managing unit 904 is held by referring to the work key ID 602 of the ECM 220 received from the demultiplexing unit 906. More specifically, the related information decrypting unit 908 transmits the work key ID 602 to the license managing unit 904. Next, the license managing unit 904 searches the license storage unit 901 for the license 230 with the work key ID 402 which is identical to the received work key ID 602.

In the case where the work key Kw 203 corresponding to the work key ID 602 is held, a transition to S1205 is made. On the other hand, in the case where the work key Kw 203 corresponding to the work key ID 602 is not held, this processing is ended.

S1205: The related information decrypting unit 908 decrypts the encryption portions of the ECM 220 by using the work key Kw 203 obtained from the license managing unit 904. The related information decrypting unit 908 transmits the decrypted ECM 220 to the real-time reception judging unit 909.

S1206: The real-time reception judging unit 909, the falsification detecting unit 910, and the contract information judging unit 911 perform the ECM judging processing to be described later with reference to FIG. 15.

S1207: The contract information judging unit 911 judges whether or not the scramble key Ks 201 can be obtained. In the case where the scramble key Ks 201 is obtained, a transition to the process of S1208 is made. In the case where the scramble key Ks 201 is not obtained, this processing is ended.

S1208: The content use control unit 912 or the content storage control unit 913 decrypts the TS packets of the encrypted content sequentially received from the demultiplexing unit 906 by using the scramble key Ks 201 received from the contract information judging unit 911.

S1209: The content use control unit 912 uses the content based on the output control information 615 extracted from the ECM 230 and/or the output control information 406 received from the license managing unit 904. The content use control unit 912 checks the output control information 615 and/or the output control information 406, and outputs the content to the digital output/analog output according to the specifications by the output control information 615 and/or the output control information 406. In addition, the content storage control unit 913 checks the output control information 615 and/or the output control information 406, and in the case where the content can be written (for example, the CCI is Copy Free), it performs processes of converting and encrypting the content into a predetermined format in compliant to a recording medium as a writing destination and, and writing the content. It is noted that, in the case where the content cannot be written (for example, the CCI is Copy Never), this processing is ended without writing the content.

It is to be noted that, in the case where the encrypted ECM 220 has been falsified but it is judged that no falsification has been made on the ECM 220 in the ECM judging process of S1205, the decoding of the content fails in this step because the decrypted scramble key K (odd) 606 and scramble key Ks (even) 607 do not have the correct values.

The description has been given above of operations of the content receiving process in this embodiment.

Figure 15:
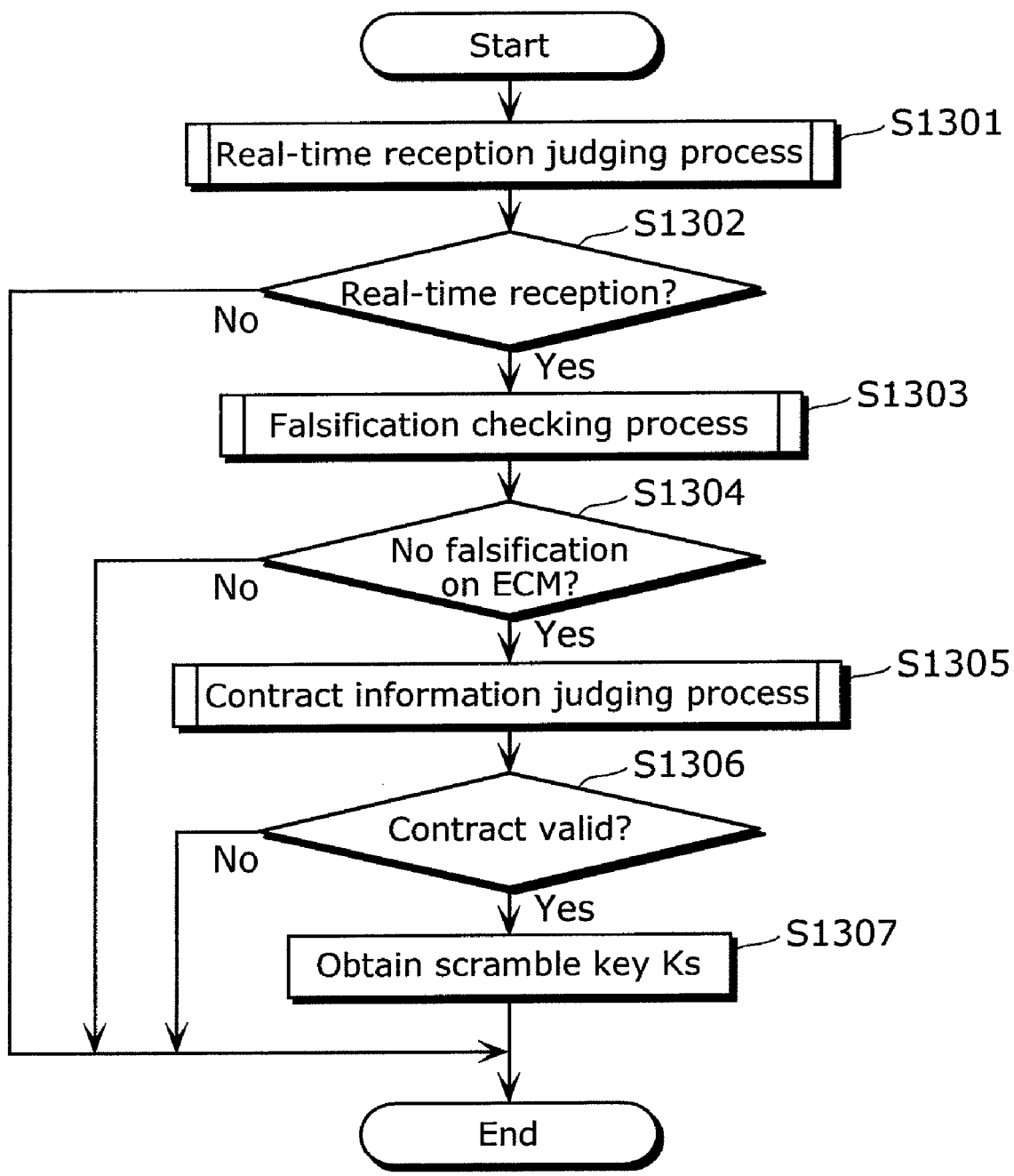
FIG. 15 is a flowchart of the operations performed in an ECM judging process according to the present invention.

Next, with reference to the flowchart shown as FIG. 15, a description is given of how the terminal device 103 performs operations of the ECM judging process for judging the availability of the ECM 220. It is to be noted that this ECM judging process shows details of S1206 in FIG. 14.

S1301: The real-time reception judging unit 909 performs real-time reception judging process to be described later with reference to FIG. 16.

S1302: The real-time reception judging unit 909 checks whether or not the content and the ECM 220 are being received "in real time" through the process of S1301. When it is judged that the content and the ECM 220 are being received "in real time", a transition is made to the process of S1303. On the other hand, when it is judged that the content and the ECM 220 are received "not in real time" (for example, the content and the ECM 220 have been stored and then re-transmitted), this processing is ended.

S1303: The falsification detecting unit 910 performs a falsification detecting process to be described later with reference to FIG. 17.

S1304: In the case where the falsification detecting unit 910 has made a judgment, in the process of S1303, that "no falsification" has been made on the ECM 220, a transition to S1305 is made. On the other hand, in the case where the falsification detecting unit 910 has made a judgment that "the ECM has been falsified", this processing is ended.

S1305: The contract information judging unit 911 performs a contract information judging process to be described later with reference to FIG. 18.

S1306: When it is judged that "a contract exists" as the result of the processing of S1305, the contract information judging unit 911 performs the process of S1307. On the other hand, when it is judged as "no contract", this processing is ended.

S1307: The contract information judging unit 911 obtains the scramble key Ks (odd) and the scramble key Ks (even) 607 from the ECM 220.

Figure 16:
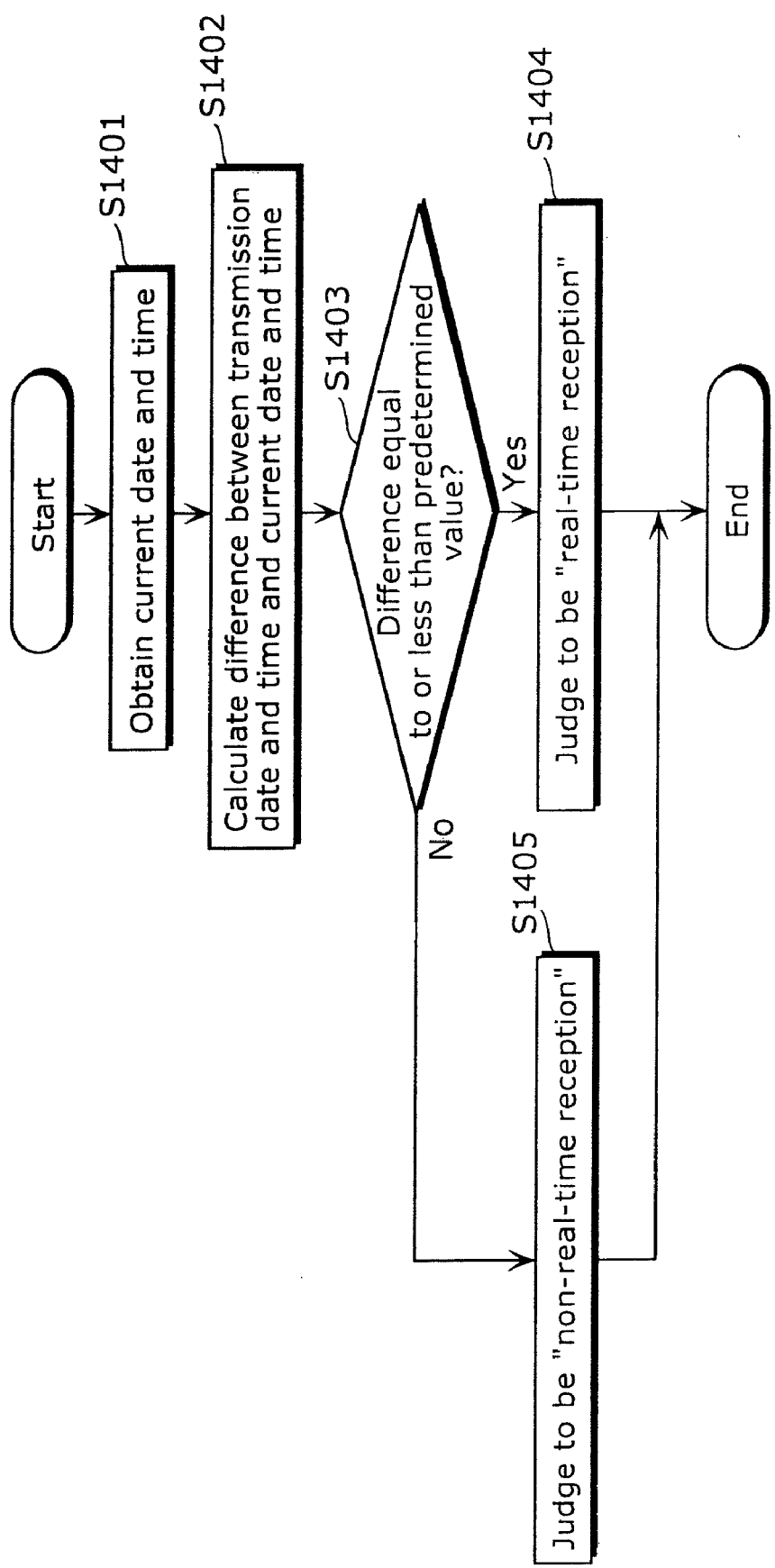
FIG. 16 is a flowchart of the operations performed in a real-time reception judging process according to the present invention.

Next, with reference to the flowchart of FIG. 16, a description is given of operations of the real-time reception judging process of S1301 in FIG. 15.

S1401: The real-time reception judging unit 909 obtains a current time from the time information obtaining unit 907.

S1402: The real-time reception judging unit 909 calculates the difference between the transmission dates and times 603 of the EMC 220 and the current time obtained from the time information obtaining unit 907. More specifically, the real-time reception judging unit 909 reads at least one transmission date and time 603 from among the transmission dates and times 603 included in the ECM 220. Next, the real-time reception judging unit 909 compares the value of the transmission date and time 603 and the value of the current time obtained from the time information obtaining unit 907. When the value of the transmission date and time 603 is greater, the real-time reception judging unit 909 subtracts the value of transmission date and time 603 from the value of the current time to obtain a desired value.

S1403: The real-time reception judging unit 909 judges whether or not the difference value calculated in S1402 is equal to or less than the defined value held in advance. When the difference value is equal to or less than the defined value, a transition is made to the process of S1404. When the difference value is greater than the defined value, a transition is made to the process of S1405.

S1404: The real-time reception judging unit 909 judges that the content and the ECM 220 are being received "in real time".

S1405: The real-time reception judging unit 909 judges that the content and the ECM 220 are being received "not in real time".

The description has been given above of operations of the real-time reception judging process in this embodiment.

Figure 17:
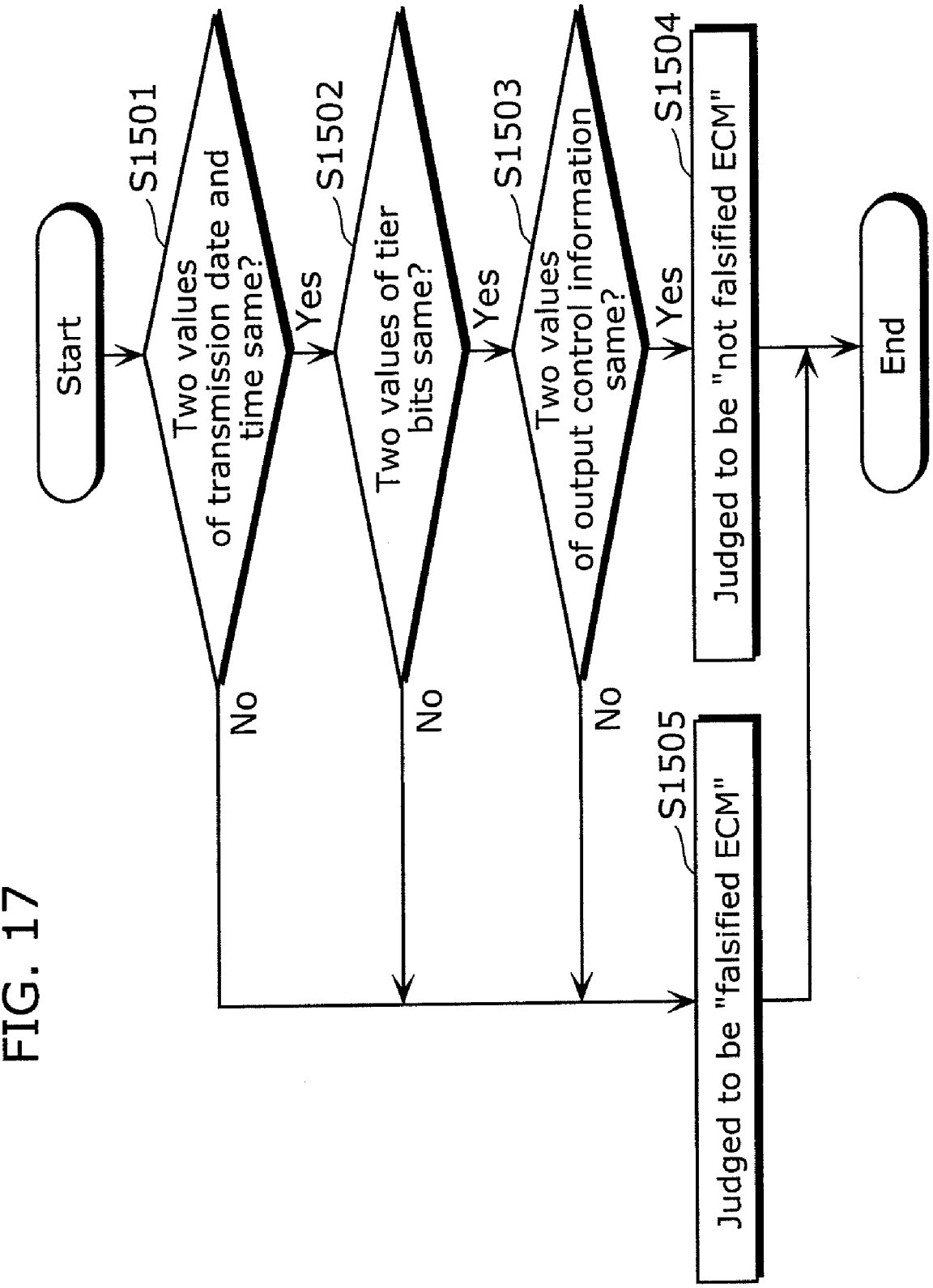
FIG. 17 is a flowchart of the operations performed in a falsification detecting process according to the present invention.

Next, with reference to the flowchart of FIG. 17, a description is given of operations of the falsification detecting process of S1303 in FIG. 15.

S1501: The falsification detecting unit 910 judges whether or not the two transmission dates and times 603 included in the ECM 220 are identical. When they are identical, a transition to the process of S1502 is made. On the other hand, when they are not identical, a transition to the process of S1504 is made.

S1502: The falsification detecting unit 910 judges whether or not the two contract judgment codes 604 included in the ECM 220 are identical. When they are identical, a transition to the process of S1503 is made. On the other hand, when they are not identical, a transition to the process of S1504 is made.

S1503: The falsification detecting unit 910 judges that "no falsification" has been made on the ECM 220.

S1504: The falsification detecting unit 910 judges that "the ECM 220 has been falsified".

The description has been given above of operations of the falsified detecting process in this embodiment.

Figure 18:
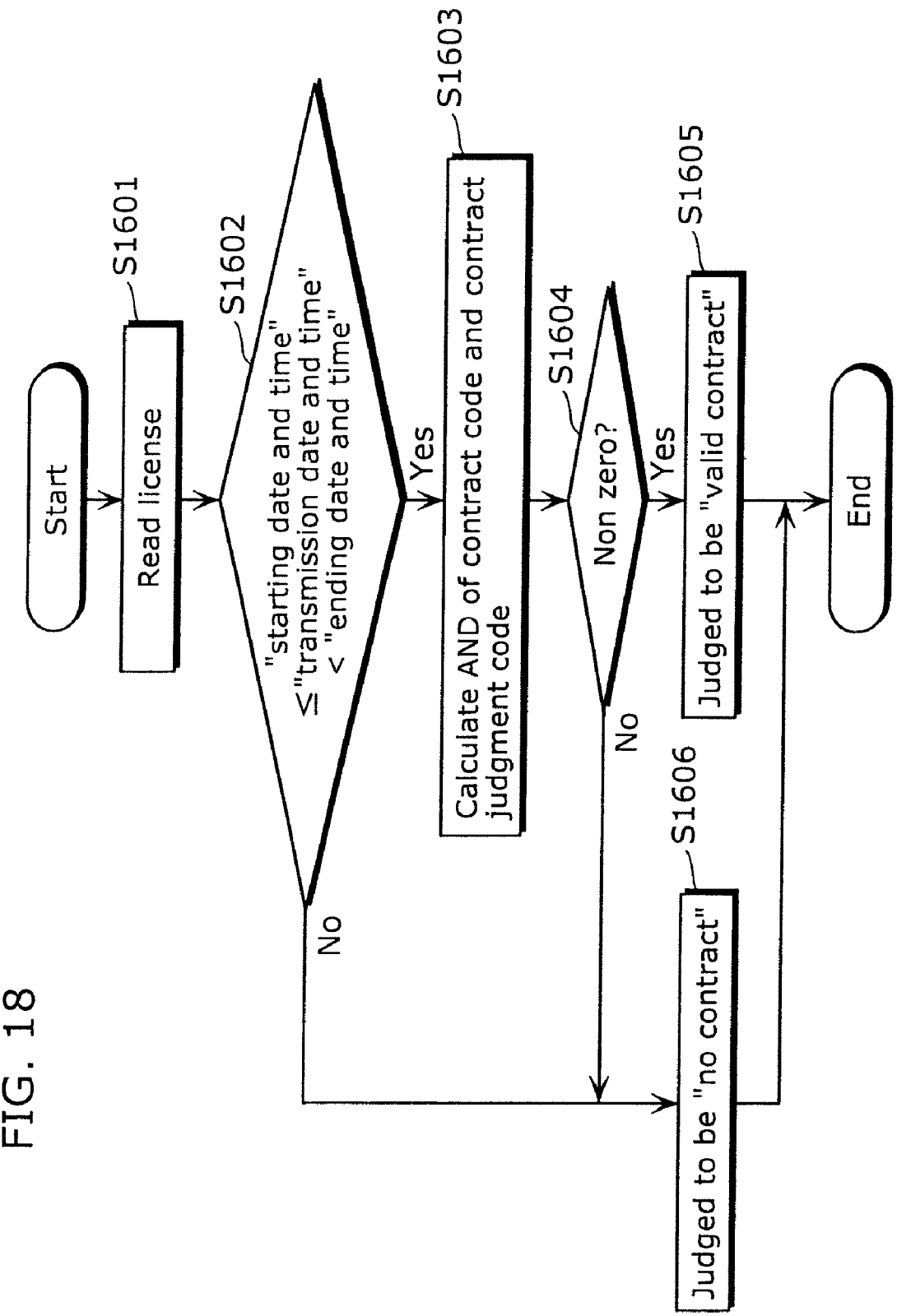
FIG. 18 is a flowchart of the operations performed in a contract information judging process according to the present invention.

Next, with reference to the flowchart of FIG. 18, a description is given of operations of the contract information judging process of S1305 in FIG. 15.

S1601: The contract information judging unit 911 reads a license 230 corresponding to the content from the license managing unit 904. More specifically, the contract information judging unit 911 requests the license managing unit 904 to transmit the license 230 including the work key Kw 203 corresponding to the work key ID 602. The license managing unit 904 searches the license storage unit 901 for the license 230, and transmits the license 230 to the contract information judging unit 911.

S1602: The contract information judging unit 911 compares the transmission date and time 603 of the ECM 220 and the starting date and time 404 and the ending date and time 405 of the license 230. In the case where the transmission date and time 603 is between the starting date and time 404 and the ending date and time 405, the processing of S1603 is executed. In the case where the transmission date and time 603 is not between the starting date and time 404 and the ending date and time 405, the processing of S1606 is executed. It is to be noted that, in the case where one of the starting date and time 404 and the ending date and time 405 does not specify any valid period (no setting for the valid period), it is unnecessary to compare the value of the transmission date and time 603 and either the starting date and time 404 or the ending date and time 405, and it is assumed that the transmission date and time 603 is between the starting date and time 404 and the ending date and time 405.

S1603: The contract information judging unit 911 calculates AND (logical product) of the contract code 403 of the license 230 and the contract judgment code 604 of the ECM 220.

S1604: The contract information judging unit 911 makes a judgment on whether or not the result of the process of S1603 is "not zero". S1603: When the result of the process of S1603 is "not zero", a transition to the process of S1605 is made. On the other hand, when the result is "not zero", a transition to the process of S1606 is made.

S1605: The contract information judging unit 911 judges that "a contract exists".

S1606: The contract information judging unit 911 judges as "no contract".

The description has been given above of operations of the contract information judging process in this embodiment.

The license 230 distributed by the license server 101 is distributed through a SAC in this embodiment. However, it is to be noted that the license server 101 may be distributed in form of data which has been encrypted and subjected to falsification detection so as to allow only the terminal device 103 of the user β to decrypt and obtain the license 230. Such data format is called EMM (Entitlement Management Message). In addition, data having a data format of a license 230 is distributed in this embodiment, but data formats are not limited to this as long as data items as included in the license 230 can be distributed from the license server 101 to the terminal device 103.

In addition, in this embodiment, it is good to cause tamper-resistant modules to execute the management of and processing made on the information for which security is especially required. Examples of such tamper-resistant modules include an IC card and a security LSI, and such management and processing is performed by the time information obtaining unit 907, related information decrypting unit 908, real-time reception judging unit 909, falsification detecting unit 910, and contract information judging unit 911 of the terminal device 103.

In addition, the function sharing of the server system (license server 101, content server 102) of the provider α side is not limited to the configuration shown in this embodiment, and some of the functions may be included in a server which is not the servers in this embodiment, and may be implemented in servers which are paired physically.

In addition, the contract code 403 (tier bits) is used as the information showing the contract of the user β in this embodiment, but the present invention is not limited thereto. As a matter of course, the present invention is applicable even when a judgment is made on the contract information by using an identifier such as a contract ID.

In addition, although an example case is taken where TS packets encrypted by the content encrypting unit 506 are multiplexed by the multiplexing unit 510 as to the content encryption in the content server 102, the content may be encrypted by the content encrypting unit 506 through the multiplexing by the multiplexing unit 510.

In addition, although an example case is taken where the content server 102 in this embodiment reads content stored in the content DB, and the content encoding unit 504 encodes it in real time, but it is good that TSs are generated off-line in advance and stored in the content storage unit 501, and thereby omitting an encoding process in the content encoding unit 504 at the time of content transmission.

In addition, although an example case is taken where the content server 102 in this embodiment generates content to be transmitted from the content storage unit 501, it is good that a source such as a live broadcast is directly inputted to the content encoding unit 504 without using the content storage unit 501.

In addition, although the content server 102 in this embodiment is intended to sequentially generate scramble keys Ks 201 in the scramble key generating unit 505, it is good that scramble keys Ks 201 are generated in advance and the stored ones are applied.

As for data arrangement of the encryption portions of the ECM 220 in this embodiment, as shown in FIG. 8, an example case is taken where the scramble key KS (odd) 606 and the scramble key Ks (even) 607 are aligned in encryption blocks which succeeds the encryption block of the transmission date and time 603 and the contract judgment code 604. However, as in the case of this embodiment, a falsification prevention effect can be obtained even when the scramble key Ks (odd) 606 or the scramble key Ks (even) 607 which succeed the transmission date and time 603 and the contract judgment code 604 are arranged, in alignment with each other, in consecutive two encryption blocks, and the scramble key Ks (odd) 606 and the scramble key Ks (even) 607 are arranged across two consecutive encryption blocks.

In addition, although the output control information 406 is included in the license 230 in this embodiment, it is good that the output control information 406 is included in the ECM 220. In this case, for example, a conceivable method is generating the output control information 406 at the positions of the two private data 605 of the ECM 220, performing a consistency check of the two output control information 406 after the decryption of the ECM 220 in the terminal device 103, and performing falsification detection on the output control information 406.

In this embodiment, an example case is taken where the real-time reception judging unit 909 holds in advance a predefined value of the comparison difference in time between the transmission date and time 603 of the ECM 220 and a current time in the time information obtaining unit 907. However, it is good that this predefined value is dynamically changeable from on a provider basis to on a contract or content basis. In this case, it is good that the output control information 406 is distributed together with the license 230 and reliable time information through a SAC or distributed in the ECM 220. When it is included in the ECM 220, for example, a conceivable method is generating the output control information 406 at the positions of the two private data 605 of the ECM 220, performing a consistency check of the two output control information 406 after the decryption of the ECM 220 in the terminal device 103, and performing falsification detection on the output control information 406. In addition, it is good to perform real-time reception judging process according to the details of the output control information 406. For example, it is conceivable that this processing is not performed in the case where the CCI of the output control information is Copy Free, or shows that writing is not allowed.

In addition, although the terminal device 103 is configured to store the work keys Kw 203 (licenses 230) in the license storage unit 901 in this embodiment, but it is good that the work keys K2 203 are obtained from the license server 101 as necessary and held.

In addition, as for the processing performed by the terminal device 103 in this embodiment, the order of processes performed by the real-time reception judging unit 909, the falsification detecting unit 910, and the contract information judging unit 911 is not limited to the processing order shown in this embodiment, and it is good that the processing order is exchanged as necessary.

In addition, in the judgment on real-time reception in this embodiment, it is good to assign a valid period to the ECM 220, and when the current time managed by the time information obtaining unit 907 is after the valid period, judge as "non real-time reception".

It has been described that the terminal device 103 cannot obtain the scramble key Ks (odd) 606 and the scramble key Ks (even) 607 in the case where the cases where: a judgment in S1302 of FIG. 15 in this embodiment is "non real-time reception"; a judgment in S1304 shows "falsified ECM"; and a judgment in S1306 shows "no contract". However, the present invention is not limited to this. It is good that the terminal device 103 can successfully obtain the scramble key Ks (odd) 606 and the scramble key Ks (even) 607, and then perform an error process as described below.

(1) Prohibiting only specific operations. For example, reproduction is allowed, but recording is not allowed. This allows the user β to view the content even when the transmission date and time 603 is not correct due to an error by the provider α.

(2) Displaying a predetermined warning message indicating that an abnormal content has been received and suggesting notification to a customer center (for example, "Abnormal content has been received. This is notified to XXX.") In this way, the provider α can understand that abnormal content is being transmitted by means of preventing unauthorized use of content and a message from an authenticated user through a telephone or the like.

(3) Notifying the provider α of the details of the error (such as occurrence of non-real-time reception and falsification on the ECM) and the details of the ECM including such error (it is good that a user's permission is necessary at that time). This allows prevention of unauthorized use and allows the provider to understand that an abnormal content is being transmitted.

It is to be noted that the present invention has been described based on the embodiment, but as a matter of course, the present invention is not limited to the above-described embodiment. The following cases are also included in the present invention.

(1) Each of the above-described devices configures a computer system including, for example, a micro processor, a ROM, a RAM, a hard disk unit, a display unit, keyboards, and a mouse. A computer program is recorded on the RAM or in the hard disk unit. The respective devices achieve their functions by means that the micro processor operates according to the computer program. Here, in order to achieve the predetermined functions, the computer program is configured by combining plural instruction codes indicating directives to the computer.

(2) Some or all of the structural elements which configure the respective devices may be integrated into a single system LSI (Large Scale Integration). The system LSI is a super multi-functional LSI manufactured by integrating the plural structural units into a single chip, and more specifically is a computer system configured to include the micro processor, ROM, ROM, and the like. A computer program is stored in the RAM. The system LSI achieves its functions by means that the micro processor operates according to the computer program.

Some or all of the structural elements which configure the respective devices may be configured as IC cards attachable/detachable to/from the respective devices or independent modules. Provided the IC cards or modules configure the computer system including the micro processor, the ROM, the RAM, and the like, the IC cards or modules may include the super multi-functional LSI. These IC cards or modules achieve their functions by means that the micro processor operates according to the computer program. These IC cards or modules may be tamper-resistant.

(4) The present invention may be a method as shown above. In addition, the present invention may be a computer program for achieving the method by using a computer, and may be a digital signal made of the computer program.

In addition, the present invention is a computer-readable recording medium on which the computer program or the digital signal is recorded. Examples of recording media include a flexible disc, a hard disc, a CD-ROM, an MO, a DVD, a DVD-ROM, a DVD-RAM, a BD (Blu-ray Disc), and a semiconductor memory. In addition, the present invention may be the digital signal recorded on these recording media.

In addition, the present invention may be used for transmitting the computer program or the digital signal via an electric communication circuit, a wireless or wired communication circuit, a network represented by the Internet, data broadcast and the like.

In addition, the present invention may be a computer system including a micro processor and a memory in which the memory stores the computer program, and the micro processor operates according to the computer program.

In addition, the present invention may allow an independent computer system to execute the program or the digital signal by recording them on the recording medium and transmitting them via the network or the like.

(5) It is good to combine the above-described embodiment and the variation examples in any ways.

INDUSTRIAL APPLICABILITY

The content distribution system and method according to the present invention is useful in a system for providing a content distribution service by using digital broadcasting, CATV, the Internet and the like, and servers, terminal devices, and the like included therein.

The invention claimed is:

1. A terminal device in a content distribution system including a server device and said terminal device, said terminal device comprising:
a processor;
a receiving unit configured to receive, from said sewer device, (I) an encrypted content, and (II) content-related information including (II-i) pieces of transmission date and time information of the encrypted content and (II-ii) a plurality of content decryption keys for decrypting the encrypted content;
a content-related information checking unit configured to check the content-related information using the processor; and
a content use control unit configured to control use of the encrypted content,
wherein the content-related information received by said receiving unit has been encrypted in Cipher Block Chaining (CBC) mode, the content-related information being a sequence of a plurality of encryption blocks,
at least two of the plurality of encryption blocks in the sequence of the plurality of encryption blocks include corresponding ones of the plurality of content decryption keys, and each of the at least two encryption blocks is immediately preceded by one of the encryption blocks in which a corresponding one of the pieces of transmission date and time information is placed, said content-related information checking unit is configured to check whether or not all the pieces of transmission date and time information arranged in the plurality of respective encryption blocks and decrypted are identical, and judge that the decrypted content-related information is incorrect when all the pieces of transmission date and time information are not identical, and said content use control unit is configured to limit the use of the encrypted content when said content-related information checking unit judges that the decrypted content-related information is incorrect.

2. A server device in a content distribution system including said sewer device and a terminal device, said server device comprising:

a processor;

a transmitting unit configured to transmit an encrypted content and content-related information including pieces of transmission date and time information of the encrypted content and a plurality of content decryption keys for decrypting the encrypted content;

a related information generating unit configured to generate, in the content-related information, the plurality of content decryption keys for decrypting the encrypted content;

a transmission date and time setting unit configured to generate, using the processor, in the content-related information, the pieces of transmission date and time information each indicating a date and time at which the content-related information is transmitted; and a related information encrypting unit configured to encrypt, in Cipher Block Chaining (CBC) mode, the content-related information in which the plurality of content decryption keys and the pieces of transmission date and time information have been generated, the encrypted content-related information being arranged as a sequence of a plurality of encryption blocks, wherein said related information generating unit is configured to generate, in the content-related information, the plurality of content decryption keys, at least two of the plurality of encryption blocks in the sequence of the plurality of encryption blocks include corresponding ones of the plurality of content decryption keys, and each of the at least two encryption blocks is immediately preceded by one of the encryption blocks in which a corresponding one of the pieces of transmission date and time information is placed, and said transmission date and time setting unit is configured to generate the pieces of transmission date and time information such that each of the pieces of transmission date and time information arranged in the plurality of respective encryption blocks indicates a same date and time.

3. A content-related information generating device which generates content-related information to be transmitted together with an encrypted content, said content-related information generating device comprising:

a processor;

a related information generating unit configured to generate, in the content-related information, a plurality of content decryption keys for decrypting the encrypted content;

a transmission date and time setting unit configured to generate, using the processor, in the content-related information, pieces of transmission date and time information each indicating a date and time at which the content-related information is transmitted; and a related information encrypting unit configured to encrypt, in Cipher Block Chaining (CBC) mode, the content-related information in which the plurality of content decryption keys and the pieces of transmission date and time information have been generated, the encrypted content-related information being arranged as a sequence of a plurality of encryption blocks, wherein said related information generating unit is configured to generate, in the content-related information, the plurality of content decryption keys, at least two of the plurality of encryption blocks in the sequence of the plurality of encryption blocks include corresponding ones of the plurality of content decryption keys, and each of the at least two encryption blocks is immediately preceded by one of the encryption blocks in which a corresponding one of the pieces of transmission date and time information is placed, and said transmission date and time setting unit is configured to generate the pieces of transmission date and time information such that each of the pieces of transmission date and time information arranged in the plurality of respective encryption blocks indicates a same date and time.

4. A content distribution system including a sewer device and a terminal device, wherein said server device includes:

a processor;

a transmitting unit configured to transmit an encrypted content and content-related information including pieces of transmission date and time information of the encrypted content and a plurality of content decryption keys for decrypting the encrypted content;

a related information generating unit configured to generate, in the content-related information, the plurality of content decryption keys for decrypting the encrypted content;

a transmission date and time setting unit configured to generate, using the processor, in the content-related information, the pieces of transmission date and time information each indicating a date and time at which the content-related information is transmitted;

a related information encrypting unit configured to encrypt, in Cipher Block Chaining (CBC) mode, the content-related information in which the plurality of content decryption keys and the pieces of transmission date and time information have been generated, the encrypted content-related information being arranged as a sequence of a plurality of encryption blocks;

said related information generating unit is configured to generate, in the content-related information, the plurality of content decryption keys;

at least two of the plurality of encryption blocks in the sequence of the plurality of encryption blocks include corresponding ones of the plurality of content decryption keys, and each of the at least two encryption blocks is immediately preceded by one of the encryption blocks in which a corresponding one of the pieces of transmission date and time information is placed; and said transmission date and time setting unit is configured to generate the pieces of transmission date and time information such that each of the pieces of transmission date and time information arranged in the plurality of respective encryption blocks indicates a same date and time, and wherein said terminal device includes:

a receiving unit configured to receive, from said sewer device, (I) an encrypted content, and (II) content-related information including (II-i) the pieces of transmission date and time information of the encrypted content and (II-ii) the plurality of content decryption keys for decrypting the encrypted content;

a content-related information checking unit configured to check the content-related information; and a content use control unit configured to control use of the encrypted content, said content-related information checking unit is configured to check whether or not all the pieces of transmission date and time information arranged in the plurality of respective encryption blocks and decrypted are identical, and judge that the decrypted content-related information is incorrect when all the pieces of transmission date and time information are not identical, and said content use control unit is configured to limit the use of the encrypted content when said content-related information checking unit judges that the decrypted content-related information is incorrect.

5. A method of using content in a content distribution system including a sewer device and a terminal device, said method comprising:

receiving, from the sewer device, (I) an encrypted content, and (II) content-related information including (II-i) pieces of transmission date and time information of the encrypted content and (II-ii) a plurality of content decryption keys for decrypting the encrypted content;

checking the content-related information using a processor; and controlling use of the encrypted content, wherein the content-related information received in said receiving has been encrypted in Cipher Block Chaining (CBC) mode, the content-related information being a sequence of a plurality of encryption blocks, at least two of the plurality of encryption blocks in the sequence of the plurality of encryption blocks include corresponding ones of the plurality of content decryption keys, and each of the at least two encryption blocks is immediately preceded by one of the encryption blocks in which a corresponding one of the pieces of transmission date and time information is placed, in said checking, whether or not all the pieces of transmission date and time information arranged in the plurality of respective encryption blocks and decrypted are identical is checked, and it is judged that the decrypted content-related information is incorrect when all the pieces of transmission date and time information are not identical, and in said controlling, the use of the encrypted content is limited when it is judged that the decrypted content-related information is incorrect in said checking of the content-related information.

6. A method of transmitting data from a server device in a content distribution system including the server device and a terminal device, said method comprising:

transmitting an encrypted content and content-related information including pieces of transmission date and time information of the encrypted content and a plurality of content decryption keys for decrypting the encrypted content;

generating, in the content-related information, the plurality of content decryption keys for decrypting the encrypted content;

generating, using a processor, in the content-related information, the pieces of transmission date and time information each indicating a date and time at which the content-related information is transmitted; and encrypting, in Cipher Block Chaining (CBC) mode, the content-related information in which the plurality of content decryption keys and the pieces of transmission date and time information have been generated, the encrypted content-related information being arranged as a sequence of a plurality of encryption blocks, wherein, in said generating of the plurality of content decryption keys, the plurality of content decryption keys is generated in the content-related information, at least two of the plurality of encryption blocks in the sequence of the plurality of encryption blocks include corresponding ones of the plurality of content decryption keys, and each of the at least two encryption blocks is immediately preceded by one of the encryption blocks in which a corresponding one of the pieces of transmission date and time information is placed, and in said generating of the pieces of transmission date and time information, the pieces of transmission date and time information are generated such that each of the pieces of transmission date and time information arranged in the plurality of respective encryption blocks indicates a same date and time.

7. A method of generating content-related information, for use in a content-related information generating device which generates content-related information to be transmitted together with an encrypted content, said method comprising:

generating, in the content-related information, a plurality of content decryption keys for decrypting the encrypted content;

generating, using a processor, in the content-related information, pieces of transmission date and time information each indicating a date and time at which the content-related information is transmitted; and encrypting, in Cipher Block Chaining (CBC) mode, the content-related information in which the plurality of content decryption keys and the pieces of transmission date and time information have been generated, the encrypted content-related information being arranged as a sequence of a plurality of encryption blocks, wherein, in said generating of the plurality of content decryption keys, the plurality of content decryption keys is generated in the content-related information, at least two of the plurality of encryption blocks in the sequence of the plurality of encryption blocks include corresponding ones of the plurality of content decryption keys, and each of the at least two encryption blocks is immediately preceded by one of the encryption blocks in which a corresponding one of the pieces of transmission date and time information is placed, and in said generating of the pieces of transmission date and time information, the pieces of transmission date and time information are generated such that each of the pieces of transmission date and time information arranged in the plurality of respective encryption blocks indicates a same date and time.

8. A program product, being embodied on a non-transitory computer-readable storage medium, for causing a computer to execute a method for using content in a content distribution system including a server device and a terminal device, said method comprising:

receiving, from said server device, (I) an encrypted content, and (II) content-related information including (II-i) pieces of transmission date and time information of the encrypted content and (II-ii) a plurality of content decryption keys for decrypting the encrypted content;

checking the content-related information; and controlling use of the encrypted content, wherein the content-related information received in said receiving has been encrypted in Cipher Block Chaining (CBC) mode, the content-related information being a sequence of a plurality of encryption blocks, at least two of the plurality of encryption blocks in the sequence of the plurality of encryption blocks include corresponding ones of the plurality of content decryption keys, and each of the at least two encryption blocks is immediately preceded by one of the encryption blocks in which a corresponding one of the pieces of transmission date and time information is placed, in said checking, whether or not all the pieces of transmission date and time information arranged in the plurality of respective encryption blocks and decrypted are identical is checked, and it is judged that the decrypted content-related information is incorrect when all the pieces of transmission date and time information are not identical, and in said controlling, the use of the encrypted content is limited when it is judged that the decrypted content-related information is incorrect in said checking of the content-related information.

9. A program product, being embodied on a non-transitory computer-readable storage medium, for causing a computer to execute a method for transmitting data from a sewer device in a content distribution system including the sewer device and a terminal device, said method comprising:

transmitting an encrypted content and content-related information including pieces of transmission date and time information of the encrypted content and a plurality of content decryption keys for decrypting the encrypted content;

generating, in the content-related information, the plurality of content decryption keys for decrypting the encrypted content;

generating, in the content-related information, the pieces of transmission date and time information each indicating a date and time at which the content-related information is transmitted; and encrypting, in Cipher Block Chaining (CBC) mode, the content-related information in which the plurality of content decryption keys and the pieces of transmission date and time information have been generated, the encrypted content-related information being arranged as a sequence of a plurality of encryption blocks, wherein, in said generating of the plurality of content decryption keys, the plurality of content decryption keys is generated in the content-related information, at least two of the plurality of encryption blocks in the sequence of the plurality of encryption blocks include corresponding ones of the plurality of content decryption keys, and each of the at least two encryption blocks is immediately preceded by one of the encryption blocks in which a corresponding one of the pieces of transmission date and time information is placed, and in said generating of the pieces of transmission date and time information, the pieces of transmission date and time information are generated such that each of the pieces of transmission date and time information arranged in the plurality of respective encryption blocks indicates a same date and time.

10. A program product, being embodied on a non-transitory computer-readable storage medium, for causing a computer to execute a method for generating content-related information to be transmitted together with an encrypted content, said method comprising:

generating, in the content-related information, a plurality of content decryption keys for decrypting the encrypted content;

generating, in the content-related information, pieces of transmission date and time information each indicating a date and time at which the content-related information is transmitted; and encrypting, in Cipher Block Chaining (CBC) mode, the content-related information in which the plurality of content decryption keys and the pieces of transmission date and time information have been generated, the encrypted content-related information being arranged as a sequence of a plurality of encryption blocks, wherein, in said generating of the plurality of content decryption keys, the plurality of content decryption keys is generated in the content-related information, at least two of the plurality of encryption blocks in the sequence of the plurality of encryption blocks include corresponding ones of the plurality of content decryption keys, and each of the at least two encryption blocks is immediately preceded by one of the encryption blocks in which a corresponding one of the pieces of transmission date and time information is placed, and in said generating of the pieces of transmission date and time information, the pieces of transmission date and time information are generated such that each of the pieces of transmission date and time information arranged in the plurality of respective encryption blocks indicates a same date and time.

11. An integrated circuit for a terminal device in a content distribution system including a sewer device and a terminal device, said integrated circuit comprising:

a processor;

a receiving unit configured to receive, from said sewer device, (I) an encrypted content, and (II) content-related information including (II-i) pieces of transmission date and time information of the encrypted content and (II-ii) a plurality of content decryption keys for decrypting the encrypted content;

a content-related information checking unit configured to check the content-related information using the processor; and a content use control unit configured to control use of the encrypted content, wherein the content-related information received by said receiving unit has been encrypted in Cipher Block Chaining (CBC) mode, the content-related information being a sequence of a plurality of encryption blocks, at least two of the plurality of encryption blocks in the sequence of the plurality of encryption blocks include corresponding ones of the plurality of content decryption keys, and each of the at least two encryption blocks is immediately preceded by one of the encryption blocks in which a corresponding one of the pieces of transmission date and time information is placed, said content-related information checking unit is configured to check whether or not all the pieces of transmission date and time information arranged in the plurality of respective encryption blocks and decrypted are identical, and judge that the decrypted content-related information is incorrect when all the pieces of transmission date and time information are not identical, and said content use control unit is configured to limit the use of the encrypted content when said content-related information checking unit judges that the decrypted content-related information is incorrect.

* * * * *